(12) United States Patent
Mawle et al.

(10) Patent No.: US 11,199,248 B2
(45) Date of Patent: Dec. 14, 2021

(54) COMPACT LINEAR TO ROTARY ACTUATOR

(71) Applicant: Woodward, Inc., Fort Collins, CO (US)

(72) Inventors: Craig D. Mawle, Fort Collins, CO (US); Mark A. Spickard, Carr, CO (US); Barry T. Brinks, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 16/399,557

(22) Filed: Apr. 30, 2019

(65) Prior Publication Data

US 2020/0347918 A1 Nov. 5, 2020

(51) Int. Cl.
*F16H 21/34* (2006.01)
*F16H 21/22* (2006.01)
(Continued)

(52) U.S. Cl.
CPC .............. *F16H 21/34* (2013.01); *B64C 13/26* (2013.01); *F15B 15/06* (2013.01); *F16C 7/023* (2013.01); *F16H 21/22* (2013.01)

(58) Field of Classification Search
CPC .......... F16C 7/023; F16H 21/22; F16H 21/32; F16H 21/34; B64C 13/30; B64C 13/25; B64C 13/36; B64C 13/28; F15B 15/06
See application file for complete search history.

(56) References Cited

U.S. PATENT DOCUMENTS

| | | | |
|---|---|---|---|
| 402,255 A * | 4/1889 | Leavitt, Jr. | F16H 21/32 74/40 |
| 812,626 A * | 2/1906 | Wilson | F16H 21/32 74/40 |

(Continued)

FOREIGN PATENT DOCUMENTS

| | | |
|---|---|---|
| AU | 2013201056 | 11/2013 |
| CA | 2772480 | 9/2012 |

(Continued)

OTHER PUBLICATIONS

PCT International Search Report and Written Opinion in International Appln. No. PCT/US2020/030527, dated Aug. 10, 2020, 12 pages.

(Continued)

*Primary Examiner* — Jake Cook
*Assistant Examiner* — T. Scott Fix
(74) *Attorney, Agent, or Firm* — Fish & Richardson P.C.

(57) ABSTRACT

The subject matter of this specification can be embodied in, among other things, a linear-to-rotary apparatus that includes a linear actuator having an actuator housing including a piston chamber, a piston shaft disposed in the piston chamber, and a rotor apparatus. The rotor apparatus includes a rotary joint defining a rotational axis, a rotor arm extending radially from the rotary joint and configured to at least partially pivot about the rotary joint, and a torque linkage pivotably connected to the rotor arm. The torque linkage is also attached to an end of the piston shaft of the piston at a pivot connection joint, where the pivot connection joint defines a pivot axis that is substantially perpendicular to the translation axis of the piston shaft.

9 Claims, 10 Drawing Sheets

(51) Int. Cl.
  *B64C 13/26* (2006.01)
  *F15B 15/06* (2006.01)
  *F16C 7/02* (2006.01)

(56) References Cited

U.S. PATENT DOCUMENTS

| | | | |
|---|---|---|---|
| 2,286,452 A | | 6/1942 | Worth |
| 2,643,833 A | * | 6/1953 | Ambroise ............... B64C 5/10 |
| | | | 244/226 |
| 2,649,077 A | | 8/1953 | Mehm |
| 2,801,068 A | | 7/1957 | Paul |
| 2,936,636 A | | 5/1960 | Wacht |
| 2,966,144 A | | 12/1960 | Self |
| 3,070,075 A | | 12/1962 | Hanselmann |
| 3,367,424 A | | 2/1968 | Shunichi et al. |
| 3,444,788 A | | 5/1969 | Sneen |
| 3,446,120 A | | 5/1969 | Sneen |
| 3,731,546 A | | 5/1973 | Macdonald |
| 3,731,597 A | | 5/1973 | Payne |
| 3,771,422 A | | 11/1973 | Kamman |
| 3,911,847 A | * | 10/1975 | Worthing ............... B63B 39/06 |
| | | | 114/150 |
| 4,296,570 A | | 10/1981 | Balbach et al. |
| 4,409,888 A | | 10/1983 | Weyer |
| 4,628,797 A | | 12/1986 | Kendall |
| 4,755,104 A | | 7/1988 | Castro et al. |
| 4,949,585 A | * | 8/1990 | Dauvegne ............ B60N 2/0224 |
| | | | 254/102 |
| 4,979,700 A | | 12/1990 | Tiedeman |
| 5,044,257 A | | 9/1991 | Scobie |
| 5,054,374 A | | 10/1991 | Scobie et al. |
| 5,235,900 A | | 8/1993 | Garceau |
| 5,386,761 A | | 2/1995 | Holtgraver |
| 5,495,791 A | | 3/1996 | Sande et al. |
| 5,538,202 A | * | 7/1996 | Thornburg ............. B64C 13/36 |
| | | | 244/215 |
| 5,549,448 A | | 8/1996 | Langston |
| 5,722,616 A | | 3/1998 | Durand |
| 5,839,346 A | | 11/1998 | Sekiya et al. |
| 5,967,587 A | | 10/1999 | Collet |
| 5,996,523 A | | 12/1999 | Fox |
| 6,361,033 B1 | | 3/2002 | Jones et al. |
| 6,769,868 B2 | | 8/2004 | Harrold |
| 6,865,982 B2 | | 3/2005 | Bunyard et al. |
| 7,384,016 B2 | | 6/2008 | Kota et al. |
| 7,436,094 B2 | | 10/2008 | Zhao et al. |
| 7,486,042 B2 | | 2/2009 | Potter et al. |
| 7,510,151 B2 | | 3/2009 | Perez-Sanchez |
| 7,549,605 B2 | | 6/2009 | Hanlon et al. |
| 7,578,476 B2 | | 8/2009 | Wiers et al. |
| 7,600,718 B2 | | 10/2009 | Perez-Sanchez |
| 7,665,694 B2 | | 2/2010 | Hein et al. |
| 7,731,124 B2 | | 6/2010 | Griffin |
| 7,762,500 B1 | | 7/2010 | Dhall |
| 7,871,033 B2 | | 1/2011 | Karem et al. |
| 7,895,935 B2 | | 3/2011 | Kells |
| 7,922,445 B1 | | 4/2011 | Pankey et al. |
| 7,930,971 B2 | | 4/2011 | Werkhoven |
| 7,954,769 B2 | | 6/2011 | Bushnell |
| 8,006,940 B2 | | 8/2011 | Zeumer |
| 8,033,509 B2 | | 10/2011 | Yount et al. |
| 8,080,966 B2 | | 12/2011 | Potter et al. |
| 8,181,550 B2 | | 5/2012 | Gemmati et al. |
| 8,210,473 B2 | | 7/2012 | Schweighart et al. |
| 8,226,048 B2 | | 7/2012 | Beyer et al. |
| 8,245,495 B2 | | 8/2012 | Pesyna et al. |
| 8,245,976 B2 | | 8/2012 | Sakurai et al. |
| 8,245,982 B2 | | 8/2012 | Vormezeele et al. |
| 8,267,350 B2 | | 9/2012 | Elliott et al. |
| 8,272,599 B2 | | 9/2012 | Haverdings |
| 8,276,852 B2 | | 10/2012 | Shmilovich et al. |
| 8,302,903 B2 | | 11/2012 | Morgan et al. |
| 8,322,647 B2 | | 12/2012 | Amraly et al. |
| 8,333,348 B1 | | 12/2012 | Miller |
| 8,336,817 B2 | | 12/2012 | Flatt |
| 8,336,818 B2 | | 12/2012 | Flatt |
| 8,362,719 B2 | | 1/2013 | Sheahan, Jr. et al. |
| 8,376,818 B2 | | 2/2013 | Homer |
| 8,393,576 B2 | | 3/2013 | Lutke et al. |
| 8,403,415 B2 | | 3/2013 | Lawson |
| 8,424,810 B1 | | 4/2013 | Shmilovich et al. |
| 8,435,000 B2 | | 5/2013 | Wong et al. |
| 8,500,526 B2 | | 8/2013 | Homer |
| 8,511,608 B1 | | 8/2013 | Good et al. |
| 8,540,485 B2 | | 9/2013 | Bogrash |
| 8,544,791 B2 | | 10/2013 | Oyama et al. |
| 8,596,582 B2 | | 12/2013 | Uchida et al. |
| 8,596,583 B2 | | 12/2013 | Eichhorn et al. |
| 8,602,352 B2 | | 12/2013 | Keller et al. |
| 8,602,364 B2 | | 12/2013 | Dostmann et al. |
| 8,622,350 B1 | | 1/2014 | Hoffenberg |
| 8,628,045 B2 | | 1/2014 | Lauwereys et al. |
| 8,684,316 B2 | | 4/2014 | Sakurai et al. |
| 8,714,493 B2 | | 5/2014 | Morris |
| 8,726,787 B2 | | 5/2014 | Glynn et al. |
| 8,746,625 B2 | | 6/2014 | Recksiek et al. |
| 8,777,153 B2 | | 7/2014 | Parker |
| 8,800,935 B2 | | 8/2014 | Francis |
| 9,163,648 B2 | | 10/2015 | Kim et al. |
| 9,234,535 B2 | | 1/2016 | Kim et al. |
| 9,593,696 B2 | | 3/2017 | Kim et al. |
| 9,631,645 B2 | | 4/2017 | Sobolewski et al. |
| 9,816,537 B2 | | 11/2017 | Kim et al. |
| 10,030,679 B2 | | 7/2018 | Kim et al. |
| 10,458,441 B2 | | 10/2019 | Sobolewski et al. |
| 2005/0225018 A1 | | 10/2005 | Tunkers |
| 2006/0181171 A1 | | 8/2006 | Zhao |
| 2009/0031718 A1 | | 2/2009 | Kells |
| 2009/0108129 A1 | | 4/2009 | Flatt |
| 2009/0260345 A1 | | 10/2009 | Chaudhry |
| 2010/0187368 A1 | | 7/2010 | Cathelain et al. |
| 2010/0319341 A1 | | 12/2010 | Blitz et al. |
| 2011/0181129 A1 | | 7/2011 | Aso |
| 2011/0198438 A1 | | 8/2011 | Coifing |
| 2012/0031087 A1 | | 2/2012 | Reynolds et al. |
| 2012/0060491 A1 | | 3/2012 | Gunter et al. |
| 2012/0111993 A1 | | 5/2012 | DeHart |
| 2012/0325976 A1 | | 12/2012 | Parker |
| 2013/0104729 A1 | | 5/2013 | Ito |
| 2013/0119197 A1 | | 5/2013 | Ducos |
| 2013/0133513 A1 | | 5/2013 | Ito |
| 2013/0181089 A1 | | 7/2013 | Recksiek et al. |
| 2013/0221158 A1 | | 8/2013 | Binkbolder et al. |
| 2013/0247754 A1 | | 9/2013 | Ito et al. |
| 2013/0283942 A1 | | 10/2013 | Bonillot et al. |
| 2013/0299633 A1 | | 11/2013 | Tierney et al. |
| 2013/0320151 A1 | | 12/2013 | Kordel et al. |
| 2013/0327887 A1 | | 12/2013 | Dyckrup et al. |
| 2013/0345908 A1 | | 12/2013 | Dorr et al. |
| 2014/0001309 A1 | | 1/2014 | Tieys et al. |
| 2014/0238226 A1 | | 8/2014 | Kim et al. |
| 2014/0238227 A1 | | 8/2014 | Kim et al. |
| 2014/0238228 A1 | | 8/2014 | Sobolewski et al. |
| 2014/0238229 A1 | | 8/2014 | Sobolewski et al. |
| 2014/0238230 A1 | | 8/2014 | Kim et al. |
| 2014/0238231 A1 | | 8/2014 | Kim et al. |
| 2014/0260737 A1 | * | 9/2014 | Smith ................... F15B 15/06 |
| | | | 74/102 |
| 2014/0271296 A1 | | 9/2014 | Kim et al. |
| 2014/0360348 A1 | * | 12/2014 | Kopp ................... F15B 15/066 |
| | | | 91/159 |
| 2018/0320712 A1 | | 11/2018 | Kim et al. |

FOREIGN PATENT DOCUMENTS

| | | |
|---|---|---|
| CN | 2429672 Y | 5/2001 |
| CN | 2683857 Y | 3/2005 |
| CN | 201876368 U | 6/2011 |
| CN | 102171914 A | 8/2011 |
| CN | 102195401 A | 9/2011 |
| CN | 202128132 U | 2/2012 |
| CN | 102597537 A | 7/2012 |
| CN | 202442867 U | 9/2012 |
| CN | 103453095 A | 12/2013 |

(56) References Cited

FOREIGN PATENT DOCUMENTS

| | | |
|---|---|---|
| CN | 103814224 A | 5/2014 |
| DE | 624423 | 1/1936 |
| DE | 871557 | 3/1953 |
| DE | 872000 | 3/1953 |
| DE | 29804298 U1 | 5/1998 |
| DE | 102008036760 | 2/2010 |
| DE | 102009052641 | 5/2011 |
| EP | 0098614 | 1/1984 |
| EP | 0669469 B1 | 9/1997 |
| EP | 1101902 | 5/2001 |
| EP | 1429037 A1 | 6/2004 |
| EP | 1985536 | 10/2008 |
| EP | 2157299 | 2/2010 |
| EP | 2562431 | 2/2013 |
| EP | 2586966 | 5/2013 |
| EP | 2644823 | 10/2013 |
| FR | 2138241 | 1/1973 |
| GB | 771595 | 4/1957 |
| GB | 893361 | 4/1962 |
| GB | 1174028 | 12/1969 |
| JP | 2003083308 A | 3/2003 |
| WO | WO 82/00045 | 1/1982 |
| WO | WO2013/119242 | 8/2003 |
| WO | WO2013/120036 | 8/2003 |
| WO | WO2013/143538 | 10/2003 |
| WO | WO2007/003000 | 1/2007 |
| WO | WO2010/097596 | 9/2010 |
| WO | WO2010/119280 | 10/2010 |
| WO | WO2011/155866 | 12/2011 |
| WO | WO2013/000577 | 1/2013 |
| WO | WO2014/029972 | 2/2014 |

OTHER PUBLICATIONS

Authorized Officer Romain Bindreiff, PCT International Preliminary Report on Patentability, PCT/US2014/017582, dated Feb. 10, 2015, 20 pages.
Authorized Officer Romain Bindreiff, PCT Written Opinion of the International Preliminary Examining Authority, PCT/US2014/017473, dated Feb. 2, 2015, 6 pages.
Authorized Officer Romain Bindreiff, PCT Written Opinion of the International Preliminary Examining Authority, PCT/US2014/017928, dated Feb. 3, 2015, 5 pages.
Chinese Third Office Action issued in Chinese Application No. 201480045873.2 dated May 8, 2018, 31 pages.
EPO Communication pursuant to Article 94(3), EP Application No. 14709113.6, dated Apr. 19, 2018, 6 pages.
European Extended Search Report in European Application No. 18210141.0, dated Mar. 22, 2019, 8 pages.
International Preliminary Report on Patentability under Chapter I issued in International Application No. PCT/2014/042257 dated Dec. 30, 2015, 9 pages.
International Search Report and Written Opinion issued in International Application No. PCT/US2014/017582 dated May 8, 2014; 11 pages.
International Search Report and Written Opinion issued in International Application No. PCT/US2014/017928 dated May 20, 2014; 12 pages.
International Search Report and Written Opinion of the International Searching Authority issued in International Application No. PCT/US2014/017473 dated May 13, 2014; 12 pages.
International Search Report and Written Opinion of the International Searching Authority issued in International Application No. PCT/US2014/042257 dated Sep. 10, 2014; 12 pages.
International Search Report and Written Opinion of the International Searching Authority issued in International Application No. PCT/US2015/013707 dated May 29, 2015; 14 pages.
International Search Report and Written Opinion of the International Searching Authority issued in International Application No. PCT/US2015/013737 dated May 21, 2015, 13 pages.
International Search Report issued in International Application No. PCT/US2015/013895 dated Jul. 31, 2015; 17 pages.
Invitation to Pay Additional Fees and Partial International Search Report issued in International Application No. PCT/US2015/013895 dated May 20, 2015; 5 pages.
Kim et al., "Rotary Piston Type Actuator with a Central Actuation Assembly", U.S. Appl. No. 13/831,220, filed Mar. 14, 2013, 61 pages.
Kim et al., "Rotary Piston Type Actuator with a Central Actuation Assembly", U.S. Appl. No. 13/921,904, filed Jun. 29, 2013, 77 pages.
Kim et al., "Rotary Piston Type Actuator with Hydraulic Supply", U.S. Appl. No. 14/258,434, filed Apr. 22, 2014, 167 pages.
Kim et al., "Rotary Piston Type Actuator", U.S. Appl. No. 13/778,561, filed Feb. 27, 2013, 56 pages.
Notice of Allowance issued in Chinese Application No. 201480023776.3 dated Feb. 5, 2018; 7 pages.
Office Action issued in Chinese Application No. 201480045873.2 dated Oct. 16, 2017; 11 pages.
Office Action issued in Chinese Application No. 201580017668.X ion dated Feb. 1, 2018; 22 pages.
Office Action issued in Chinese Application No. 201580062794.7 dated Mar. 30, 2018, 24 pages.
Office Action issued in Chinese Application No. 201780023776.3 dated Mar. 31, 2017; 5 pages.
PCT International Preliminary Report on Patentability, PCT/US2014/017473, dated Jul. 2, 2015, 21 pages.
PCT International Preliminary Report on Patentability, PCT/US2014/017928, dated Jul. 2, 2015, 24 pages.
Sobolewski et al., "Rotary Piston Type Actuator with Modular Housing", U.S. Appl. No. 14/170,461, dated Jan. 31, 2014, 100 pages.
Sobolewski et al., "Rotary Piston Type Actuator with Pin Retention Features", U.S. Appl. No. 14/170,434, dated Jan. 31, 2014, 97 pages.
The State Intellectual Property Office of People's Republic of China, Chinese First Office Action, dated Feb. 4, 2017, 24 pages.

* cited by examiner

COMPACT LINEAR TO ROTARY ACTUATOR

TECHNICAL FIELD

This instant specification relates to rotary motion assemblies, for example, linear-to-rotary motion assemblies.

BACKGROUND

Rotary actuation, linear actuation, or both, is used to control some mechanical devices, such as aircraft flight control surfaces, rotary valve assemblies, and other applications. Rotary actuators of various forms are used as part of some mechanical devices to deliver rotary motion in an efficient manner and a compact space. Some rotary actuators are desirable because they maintain constant torque and conserve space, but include a number of seals with undesirable side loads. Some linear actuators are used to provide rotary motion in certain mechanisms, but are limited in their operating range of rotary motion. Also, it can be difficult to provide leak-free performance in typical rotary hydraulic actuators, and linear actuators often take up significantly more space than typical rotary hydraulic actuators.

SUMMARY

In general, this document describes linear-to-rotary motion systems, such as compact hinge line actuators.

Some aspects of the disclosure encompass a linear-to-rotary motion apparatus including a first linear actuator. The first linear actuator includes a first actuator housing including a first piston chamber, and a first piston shaft disposed at least partially within the first piston chamber, the first piston shaft to translate within the first piston chamber along a first translation axis and including a first piston shaft end to selectively extend and retract linearly along the first translation axis relative to the first actuator housing. The first linear actuator also includes a rotor apparatus including a first rotary joint defining a first rotational axis that is substantially perpendicular to the first translation axis, a rotor arm extending radially from the first rotary joint to at least partly pivot about the first rotary joint, where the rotor arm has a rotor arm end positioned away from the first rotary joint, and a first torque linkage having a first torque linkage end pivotably connected to the rotor arm end of the rotor arm, and a second torque linkage end opposite the first torque linkage end and pivotably connected to the first piston shaft end of the first piston shaft at a first pivot connection joint. The first pivot connection joint defines a first pivot axis that is substantially perpendicular to the first translation axis of the first piston shaft. The first linear actuator also includes a guide structure connected to the first pivot connection joint, the guide structure to at least partially guide movement of the first pivot connection joint.

This, and other aspects, can include one or more of the following features. The guide structure can include a first guide slider positionally fixed in space relative to the first rotary joint and slidably coupled to the first pivot connection joint, the first guide slider to guide sliding movement of the pivot connection joint parallel to the first translation axis. The first actuator housing can pivot about a second rotary joint, the second rotary joint being fixed in space relative to the first rotary joint and having a second rotational axis that is perpendicular to the first translation axis. The guide structure can include a first guide linkage having a first guide linkage end pivotably connected to the first pivot connection joint at the first piston shaft end, and a second guide linkage end pivotably connected to a third rotary joint fixed in space relative to the first rotary joint, the first guide linkage to at least partly pivot about a third rotational axis of the third rotary joint, the third rotational axis being perpendicular to the first translation axis and parallel to the first rotational axis. The second rotational axis can intersect with the first translation axis. A distance from the second rotary joint to the first rotary joint can be relatively less than the distance from the second rotary joint to the first piston shaft end. The first linear actuator can be a fluid actuator. The fluid actuator can be a double-acting fluid actuator. One of the first actuator housing or the rotor arm can be coupled to an airframe structure of an aircraft, and the other of the first actuator housing or the rotor arm can be coupled to a moveable control surface of the aircraft, such that the moveable control surface can move relative to the airframe structure by the linear-to-rotary motion apparatus. The apparatus can further include a second linear actuator including a second actuator housing including a second piston chamber, and a second piston shaft disposed at least partially within the second piston chamber to translate within the second piston chamber of the second actuator housing along a second translation axis, where the second piston shaft includes a second piston shaft end to selectively extend and retract linearly along the translation axis relative to the second actuator housing, and the rotor arm includes a second rotor arm end positioned away from the first rotary joint and away from the first rotor arm end, where the second rotor arm end is positioned substantially opposite the first rotor arm end with respect to the first rotary joint. The rotor apparatus can further include a second torque linkage having a third torque linkage end pivotably connected to the second rotor arm end of the rotor arm, and a fourth torque linkage end opposite the third torque linkage end and pivotably connected to the second piston shaft end of the second piston shaft at a second pivot connection joint, the second pivot connection joint defining a second pivot axis that is substantially perpendicular to the second translation axis of the second piston shaft and parallel to the first pivot axis of the first pivot connection joint, and a second guide structure connected to the second pivot connection joint to at least partially guide movement of the second pivot connection joint. The second guide structure can include a second guide slider positionally fixed in space relative to the first rotary joint and slidably coupled to the second pivot connection joint, the second guide slider to guide sliding movement of the second pivot connection joint parallel to the second translation axis. The second actuator housing can pivot about a fourth rotary joint, the fourth rotary joint being fixed in space relative to the first rotary joint and having a fourth rotational axis that is perpendicular to the second translation axis. The second guide structure can include a second guide linkage having a third guide linkage end pivotably connected to the second pivot connection joint at the second piston shaft end, and a fourth guide linkage end pivotably connected to a third rotary joint fixed in space relative to the first rotary joint, the second guide linkage to at least partly pivot about a third rotational axis of the third rotary joint, the third rotational axis being perpendicular to the second translation axis and parallel to the first rotational axis. The fourth rotational axis can intersect with the second translation axis. The first actuator housing and the second actuator housing can be coupled to an airframe structure of an aircraft, and the rotor arm can be coupled to a moveable control surface of the aircraft, such that the moveable control surface can move relative to the airframe structure by the linear-to-rotary motion apparatus. The first actuator housing and the second actuator housing can be coupled to the moveable control surface of the aircraft, and the rotor arm can be coupled to the airframe structure of an aircraft, such that the moveable control surface can move relative to the airframe structure by the linear-to-rotary motion apparatus. At least one of the first linear actuator or the second linear actuator can be a fluid actuator. At least one of the first linear actuator or the second linear actuator can be a double-acting fluid actuator.

Certain aspects of the disclosure encompass a method for transmitting rotary motion. The method includes selectively extending or retracting a first piston shaft end of a first piston shaft of a first linear actuator linearly along a translation axis relative to a first actuator housing of the first linear actuator, the first piston shaft at least partially disposed within the first actuator housing, and the first piston shaft coupled to a first pivot connection joint at the first piston shaft end, the first pivot connection joint defining a first pivot axis that is substantially perpendicular to the translation axis. The method also includes guiding, with a guide structure, movement of the first pivot connection joint, and in response to selectively extending or retracting the first piston shaft end of the first piston shaft, urging motion of a first torque linkage connected to the first pivot connection joint at a first torque linkage end of the first torque linkage, where the first torque linkage can at least partially pivot about the first pivot axis, and the first torque linkage includes a second torque linkage end opposite the first torque linkage end. The method further includes, in response to urging motion of the first torque linkage, urging pivot motion of a rotor arm about a first rotary joint defining a first rotational axis that is substantially perpendicular to the translation axis, the rotor arm including a first rotor arm end proximate to the first rotary joint and a second rotor arm end pivotably connected to the second torque linkage end of the first torque linkage.

This, and other aspects, can include one or more of the following features. The guide structure can include a first guide slider, and guiding movement of the first pivot connection joint can include guiding movement of the first pivot connection joint with the first guide slider positionally fixed in space relative to the first rotary joint and slidably coupled to the first pivot connection joint. Guiding movement the first pivot connection joint with the first guide slider can include guiding linear movement of the first pivot connection joint parallel to the translation axis. The first actuator housing can pivot about a second rotary joint at least partially in response to selectively extending or retracting the first piston shaft end, the second rotary joint being fixed in space relative to the first rotary joint and having a second rotational axis that is parallel to the first rotational axis of the first rotary joint. The guide structure can include a first guide linkage pivotably connected at a first guide linkage end to a third rotary joint fixed in space relative to the first rotary joint, the first guide linkage pivotably connected to the first pivot connection at a second guide linkage end opposite the first guide linkage end, and guiding movement of the first pivot connection joint can include guiding rocker movement of the first pivot connection joint about the third rotary joint with the first guide linkage, the third rotary joint defining a third rotational axis parallel to the first pivot axis and perpendicular to the translation axis. A distance from the second rotary joint to the first rotary joint can be relatively less than the distance from the second rotary joint to the first piston shaft end. The first linear actuator can be a linear fluid actuator, and extending or retracting the first piston shaft end of the first piston shaft of the first linear actuator linearly relative to the first housing of the first linear actuator can include providing pressurized fluid to the linear fluid actuator. The linear fluid actuator can be a double-acting fluid actuator. One of the first actuator housing or the rotor arm can be coupled to an airframe structure of an aircraft, and the other of the first actuator housing or the rotor arm can be coupled to a moveable control surface of the aircraft, and the method can further include urging, by one of the first actuator housing or the rotor arm, motion of the moveable control surface of the aircraft relative to the airframe structure of the aircraft. The method can further include selectively retracting or extending, opposite the selective extending or retracting of the first piston shaft end, a second piston shaft end of a second piston shaft of a second linear actuator linearly along a second translation axis relative to a second actuator housing of the second linear actuator, the second piston shaft at least partially disposed within the second actuator housing, and the second piston shaft coupled to a second pivot connection joint at the second piston shaft end, the second pivot connection joint defining a second pivot axis that is substantially perpendicular to the second translation axis. The method can further include guiding, with a second guide structure, movement of the second pivot connection joint, urging motion of a second torque linkage connected to the second pivot connection joint at a third torque linkage end of the second torque linkage in response to selectively retracting or extending the second piston shaft end of the second piston shaft, the second torque linkage to at least partially pivot about the second pivot axis, and the second torque linkage including a fourth torque linkage end opposite the third torque linkage end, and urging pivot motion of the rotor arm about the first rotary joint in response to urging motion of the second torque linkage, the rotor arm including a third rotor arm end pivotably connected to the fourth torque linkage end of the second torque linkage. The first linear actuator can be a first linear fluid actuator, and selectively extending or retracting the first piston shaft end of the first piston shaft of the first linear actuator linearly relative to the first housing of the first linear actuator can include providing pressurized fluid to the linear fluid actuator. The second linear actuator can be a second linear fluid actuator, and selectively extending or retracting the second piston shaft end of the second piston shaft of the second linear actuator linearly relative to the second housing of the second linear actuator can include providing pressurized fluid to the linear fluid actuator. The first linear fluid actuator and the second linear fluid actuator can form a double-acting fluid actuator.

In some aspects, a linear-to-rotary motion apparatus includes a linear actuator including an actuator housing including a piston chamber, and a piston shaft disposed at least partially within the piston chamber to translate within the piston chamber along a translation axis, the piston shaft including a piston shaft end to selectively extend and retract linearly along the translation axis relative to the actuator housing. The linear actuator includes a rotor apparatus including a rotary joint defining a rotational axis that is substantially perpendicular to the translation axis, a rotor arm extending radially from the rotary joint to at least partially pivot about the rotary joint, the rotor arm having a first rotor arm end proximate to the rotary joint and a second rotor arm end away from the first rotor arm end, and a torque linkage having a torque linkage end pivotably connected to the second rotor arm end of the rotor arm, and a second torque linkage end opposite the first torque linkage end and pivotably connected to the piston shaft end of the piston shaft at a pivot connection joint, the pivot connection joint defining a pivot axis that is substantially perpendicular to the translation axis of the piston shaft.

The systems and techniques described here may provide one or more of the following advantages. First, a linear-to-rotary apparatus can reduce or eliminate side loads on seals of an actuator system, while also fitting in a compact space, such as the same size, or smaller size, design envelope as a comparable rotary actuator.

The details of one or more implementations of the subject matter described in this disclosure are set forth in the accompanying drawings and the description below. Other features, aspects, and advantages of the subject matter will be apparent from the description, the drawings, and the claims.

DESCRIPTION OF DRAWINGS

Like reference numbers and designations in the various drawings indicate like elements.

DETAILED DESCRIPTION

This disclosure describes compact hinge line actuators, for example, for aircraft equipment such as thin wing spar actuators or other movable structures. A compact hinge line actuator described herein is a linear-to-rotary motion assembly that converts linear movement of a linear actuator to a rotary output of a rotor arm via one or more links. For example, a four-bar mechanism driven by a linear actuator converts linear force to a rotary output within a constrained design envelope, such as a compact design envelope of a thin wing and spar of an aircraft. In some instances, a compact hinge line actuator includes a linear actuator that drives a piston shaft, where the piston shaft moves an end of a torque link, and an opposite end of the torque link thereby moves a rotor arm that rotates about a rotary joint. The piston shaft, torque link, and rotor arm can overlap in the 2D plane of rotation, but are out of plane, or offset, from each other to reduce or eliminate component interference in order to fit within a compact design envelope, such as a design envelope of a thin wing and spar of an aircraft. In some implementations, a guide structure connects to an end of the piston shaft to guide the movement of the piston shaft, which can reduce or eliminate bending moments on the piston so stresses within the hinge line actuator are primarily simple tension, compression, or shear at the interfaces of the actuator members. In some examples, a housing of the linear actuator is mounted, directly or rotatably, to a stationary portion of a thin wing, and the rotor arm couples to a rotary portion of the thin wing, such as a rotatable spar of the fixed wing.

The development of thin wings on winged aircraft, such as fixed wing aircraft, to improve efficiency reduces the space envelope for primary flight control surface actuation. Some existing technologies use rotary vane actuators (RVA) or rotary piston actuators (RPA) to fit within the available space envelope and also meet performance requirements. However, RVAs have sealing issues at high pressures, and an RPA has internal seals that are loaded as a function of stroke and torque against some seal recommendations, the cost and weight of an RPA is often significantly more than linear actuation systems, and an RPA can be limited in rotational degrees of travel (e.g., 42 degrees). Further, extending rotational travel with dual acting RPA configurations creates backlash and stiffness issues. In the present disclosure, a compact hinge line actuator system includes a linear-to-rotary actuation system that fits in a compact space, such as the same size, or smaller size, design envelope as an RPA, and can reduce or eliminate side load on seals of the actuator system.

Figure 1A:
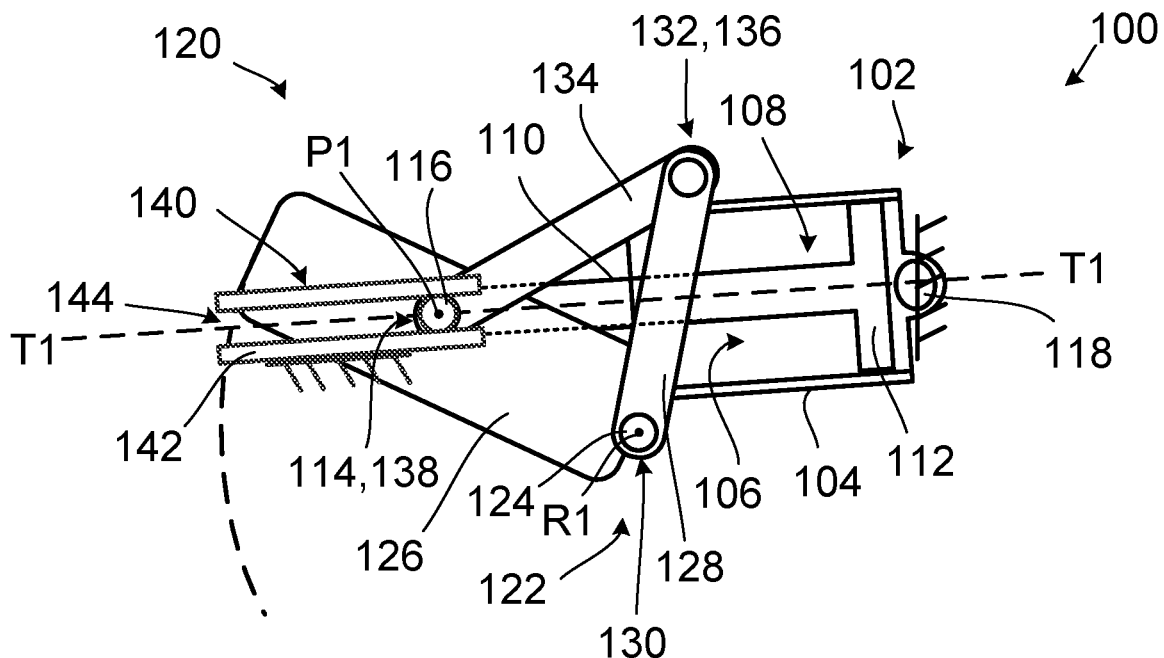
FIGS. 1A and 1B are schematic side views of an example linear-to-rotary motion apparatus in a first position and a second position, respectively.
Figure 1B:
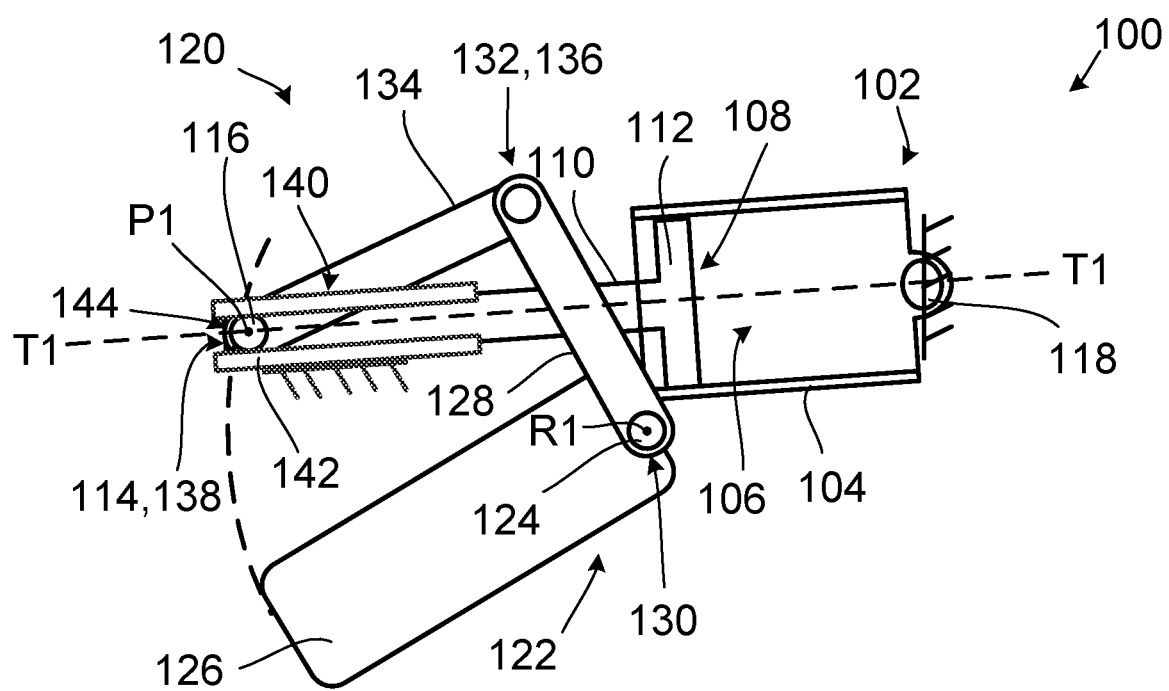

A compact hinge line actuator is a linear-to-rotary motion apparatus. FIGS. 1A and 1B are schematic side views of an example linear-to-rotary motion apparatus 100, where FIG. 1A shows the apparatus 100 in a first position and FIG. 1B shows the apparatus 100 in a second position. The apparatus 100 includes a linear actuator 102 including an actuator housing 104 with a piston chamber 106, and piston 108 with a piston shaft 110 disposed at least partially within the piston chamber 106. The piston 108, including the piston shaft 110 and a piston cylinder 112, translates within the piston chamber 106 along a translation axis T1. The translation axis T1 is a longitudinal axis centered on and extending along the longitudinal length of the piston shaft 110 and piston cylinder 112. The piston cylinder 112 is a cylindrical portion of the piston 108 configured to sealingly engage an inner surface of the actuator housing 104 and translate within the piston chamber 106 of the actuator housing 104. In some implementations, the linear actuator 102 is a fluid actuator (e.g., hydraulic actuator), such that pressurized fluid within the piston chamber 106 imparts a directional force on the piston cylinder 112 along the translation axis T1 and drives the piston 108 to translate along the translation axis T1 in response to the directional force. A piston shaft end 114, at a longitudinal end of the piston shaft 110 opposite the piston cylinder 112, selectively extends and retracts linearly along the translation axis T1 relative to the actuator housing 104.

In some implementations, the actuator housing 104 is pivotably mounted on a rotary joint, and configured to at least partially pivot about the rotary joint. For example, FIGS. 1A and 1B show the actuator housing 104 pivotably mounted on a second rotary joint 118 (described in more detail later) such that the actuator housing 104, the piston 108, and the translation axis T1 can rotate, or pivot, about the second rotary joint 118 during operation. However, the actuator housing 104 can be mounted in other ways. For example, the actuator housing 104 can be fixedly mounted to a fixed surface (e.g., a stationary portion of a wing), or otherwise mounted to a surface. In some examples, the type of mounting of the linear actuator 102, particularly the actuator housing 104, can be at least partially dependent on the type of structural connections or linkages between the piston shaft 110 and a rotor apparatus.

The example apparatus 100 includes a rotor apparatus 120 connected to the linear actuator 102. The rotor apparatus 120 receives a linear input from the linear actuator 102 (e.g., a linear translation of the piston 108) and converts the linear input to a rotary output of a rotor element. The rotor apparatus 120 includes a rotor arm 122 rotatably coupled, or pivotably coupled (e.g., coupled so as to be able to pivot), to a first rotary joint 124 and configured to at least partially rotate or pivot about the first rotary joint 124. The first rotary joint 124 is fixed in space. For example, the first rotary joint 124 can be mounted to a stationary structure, where the position of the rotary joint 124 is fixed relative to the stationary structure. The rotary joint 124 defines a first rotational axis R1 about which the rotor arm 122 can pivot. In some instances, the first rotational axis R1 is perpendicular (exactly or substantially) to the translation axis T1.

FIGS. 1A and 1B schematically show the rotor arm 122 as including a first rotor arm portion 126 and a second rotor arm portion 128. While FIGS. 1A and 1B show the rotor arm 122 as having two distinct rotor arm portions 126 and 128, the rotor arm portions 126 and 128 are at least partially coupled to each other such that the first rotor arm portion 126 and the second rotor arm portion 128 rotate, or pivot, about the first rotary joint 124 together. For example, a force applied to either of the first rotor arm portion 126 or the second rotor arm portion 128 can cause both the first rotor arm portion 126 and the second rotor arm portion 128 to rotate together about the first rotary joint 124.

The first rotor arm portion 126 (or first rotor arm) extends radially from the first rotary joint 124, and the second rotor arm portion 128 (or second rotor arm) also extends radially from the first rotary joint 124. In some implementations, a first rotor arm end 130 of the second rotor arm portion (e.g., a longitudinal end of the second rotor arm portion 128 proximate to the first rotary joint 124) is affixed to the first rotor arm portion 126, and a second rotor arm end 132 of the second rotor arm portion 128 (e.g., a longitudinal end of the second rotor arm portion 128 opposite the first rotary joint 124 and opposite the first rotor arm end 130) can be spaced away from the first rotor arm portion 126.

A torque linkage 134 pivotably connects to the rotor arm 122 at a first end of the torque linkage 134 and pivotably connects to the piston shaft 110 at a second end of the torque linkage 134. In the example apparatus 100 of FIGS. 1A and 1B, the torque linkage 134 pivotably connects to the second rotor arm end 132 of the second rotor arm portion 128 at a first torque linkage end 136 (e.g., a longitudinal end of the torque linkage 134), and pivotably connects to the piston shaft end 114 at a second torque linkage end 138 (e.g., a longitudinal end of the torque linkage 134 opposite the first torque linkage end 136). The pivot connection at the piston shaft end 114 defines a first pivot connection joint 116, where the piston shaft 110 pivotably connects to the torque linkage 134. The first pivot connection joint 116 defines a first pivot axis P1 that is (substantially or exactly) perpendicular to the translation axis T1, and in some instances, intersects the translation axis T1 at the first piston shaft end 114.

The piston 108, rotor arm 122, and torque linkage 134 are rigid structures with pivot connections, as described earlier. Translation of the piston 108 prompts movement of the pivot connection joint 116, which prompts movement of the torque linkage 134, which prompts movement of the rotor arm 122 (e.g., rotation of the rotor arm 122 about the first rotary joint 124). FIGS. 1A and 1B show the example apparatus 100 on a two-dimensional (2D) viewing plane, where the linear actuator 102 and the rotor apparatus 120 have interfering and overlapping elements in the 2D viewing plane. However, some of the elements of example apparatus 100 are positioned in offset, parallel planes to avoid interference of parts. For example, the piston 108 and actuator housing 104 can be centered on a first plane, the torque linkage 134 can be centered on a second plane parallel and offset from the first plane, and the rotor arm 122 (e.g., first rotor arm portion 126 and/or second rotor arm portion 128) can be centered on a third plane parallel and offset from both the first plane and the second plane. The pivot connection joint 116 can extend perpendicular to the first plane and at least between the first plane and the second plane to pivotably connect the piston shaft end 114 to the torque linkage 134. The pivot connection at the second rotor arm end 132 of the second rotor arm portion 128 and the first torque linkage end 136 of the torque linkage 134 can include a pivot joint that extends perpendicular to the second plane and at least between the second plane and the third plane to pivotably connect the second rotor arm end 132 and the first torque linkage end 136. In some instances, the first pivot axis P1 and the first rotational axis R1 are parallel, such that movement and/or rotation of the piston 108, rotor arm 122, and torque linkage 134 are visible within the same 2D viewing plane of rotation, though each of the piston 108, rotor arm 122, and torque linkage 134 can be in offset, parallel planes to avoid interference of elements during operation.

In some implementations, such as shown in FIGS. 1A and 1B, the example apparatus 100 includes a guide structure 140 that connects to and at least partially guides movement of the first pivot connection joint 116 during actuation of the linear actuator 102 (for example, translation of the piston 108 relative to the actuator housing 104). The guide structure 140 can reduce or eliminate bending moments in the piston 108, torque linkage 134, and/or rotor arm 122 such that the stresses in the apparatus 100 are primarily simple tension, compression, or shear. For example, guiding the movement of the pivot connection joint 116 guides movement of the piston shaft end 114 of the piston shaft 110 to avoid bending moments along the longitudinal length of the piston 108 (i.e., length of piston shaft 110 plus piston cylinder 112). The guide structure 140 can eliminate or reduce excess stresses and/or bending moments at the piston cylinder 112 such that stresses at the piston cylinder 112 and piston shaft 110 are simple tension, compression, or shear. The guide structure 140 can also improve the reliability and life of the linear actuator 102, for example, by reducing the stresses that the linear actuator 102 experiences during operation.

Other implementations can exclude the guide structure 140. For example, the piston 108 can be self-guiding in that the guide structure 140 may be optionally excluded. In some examples, the interface of the piston cylinder 112 and the actuator housing 104 at least partially guide the movement of the piston shaft end 114 along the translation axis T1. In certain examples, the actuator housing 104 includes a guide ring or other structure at an end of the actuator housing 104 to at least partly stabilize the piston shaft 110 along the translation axis.

The guide structure 140 can take many forms. In the example apparatus 100 of FIGS. 1A and 1B, the guide structure 140 includes a guide slider 142 that is positionally fixed in space relative to the first rotary joint 124 and slidably couples to the first pivot connection joint 116. The guide slider 142 guides a sliding movement of the pivot connection joint 116, for example, by providing a channel 144 for the pivot connection joint 116 to travel along. In some examples, the pivot connection joint 116 includes a peg or other protrusion that engages the channel 144 of the pivot connection joint 116. In the example apparatus 100 of FIGS. 1A and 1B, the channel 144 is linear, and extends parallel to (e.g., in line with) the first translation axis T1. However, the shape and orientation of the channel 144 can vary. For example, the channel 144 of the guide slider 142 can be curved (e.g., an arc shape or spline shape), angled offset from the translation axis T1, parallel but offset from the translation axis T1, or another shape and/or orientation. The guide slider 142 guides the first pivot connection joint 116 along a desired path, for example, such that the linear motion of the piston 108 is transmitted to rotary motion of the rotor arm 122. The guide slider 142 can be in the same plane as the piston 108 or the torque linkage 134, or can be in a different, offset parallel plane and engage the pivot connection joint 116.

As described earlier, the actuator housing 104 of the example apparatus 100 is shown as pivotably mounted on the second rotary joint 118. In instances where the channel 144 of the guide slider 142 is parallel and in line with the translation axis T1, the actuator housing 104 does not rotate about the second rotary joint 118 during operation, for example, because the guide slider 142 guides the first pivot connection joint 116 along a stationary translation axis T1. In some implementations, the rotary joint 118 is excluded and the actuator housing 104 fixedly mounts to a stationary surface of the apparatus 100 (e.g., a stationary surface of a fixed wing structure). In some other implementations, such as an example apparatus with a guide slider with a channel that is not in line with the translation axis T1, the actuator housing 104 can rotate about the second rotary joint 118 during operation of the linear actuator 102, where the guide slider guides movement of the first pivot connection joint 116 within and along the channel.

FIGS. 1A and 1B show a first, fully retracted position of the piston 108 and a second, fully extended position of the piston 108, respectively. In FIG. 1A, the piston 108 is in a fully retracted position, which correlates to the rotor arm 122 being oriented at a first, minimum angular position. In FIG. 1B, the piston 108 is in a fully extended position, which correlates to the rotor arm 122 being oriented at a second, maximum angular position. The angular range between the first, minimum angular position and the second, maximum angular position can vary. In some examples, the angular range is up to 44 degrees, or in some instances, up to 70 degrees with a width increase of the design envelope. For example, increasing the width of the design envelope allows for a longitudinally larger piston translation, thereby increasing the rotational output of the rotor arm. The width increase can include extending the length of the actuator 102 (for example, along axis T1) to allow longer linear motion of the piston 108, hence a larger rotational motion (with diminishing returns as the multiple links approach alignment). The width can vary between an extended limit and a retracted limit of the actuator 102. In some examples, the extended limit includes the orientation of the arm ends 132, 136 approaching or crossing axis T1 because this positioning can cause binding, mechanism inversion, or instability of the motion of the links. In certain examples, the retracted limit includes the orientation of the links 134 and 128 producing only radial forces and no net torque (bind). By adjusting a length of the links, angular motion of less than 180 degrees could be possible if R1 is also coincident to T1 and link 134 is longer than link 128.

Figure 1C:
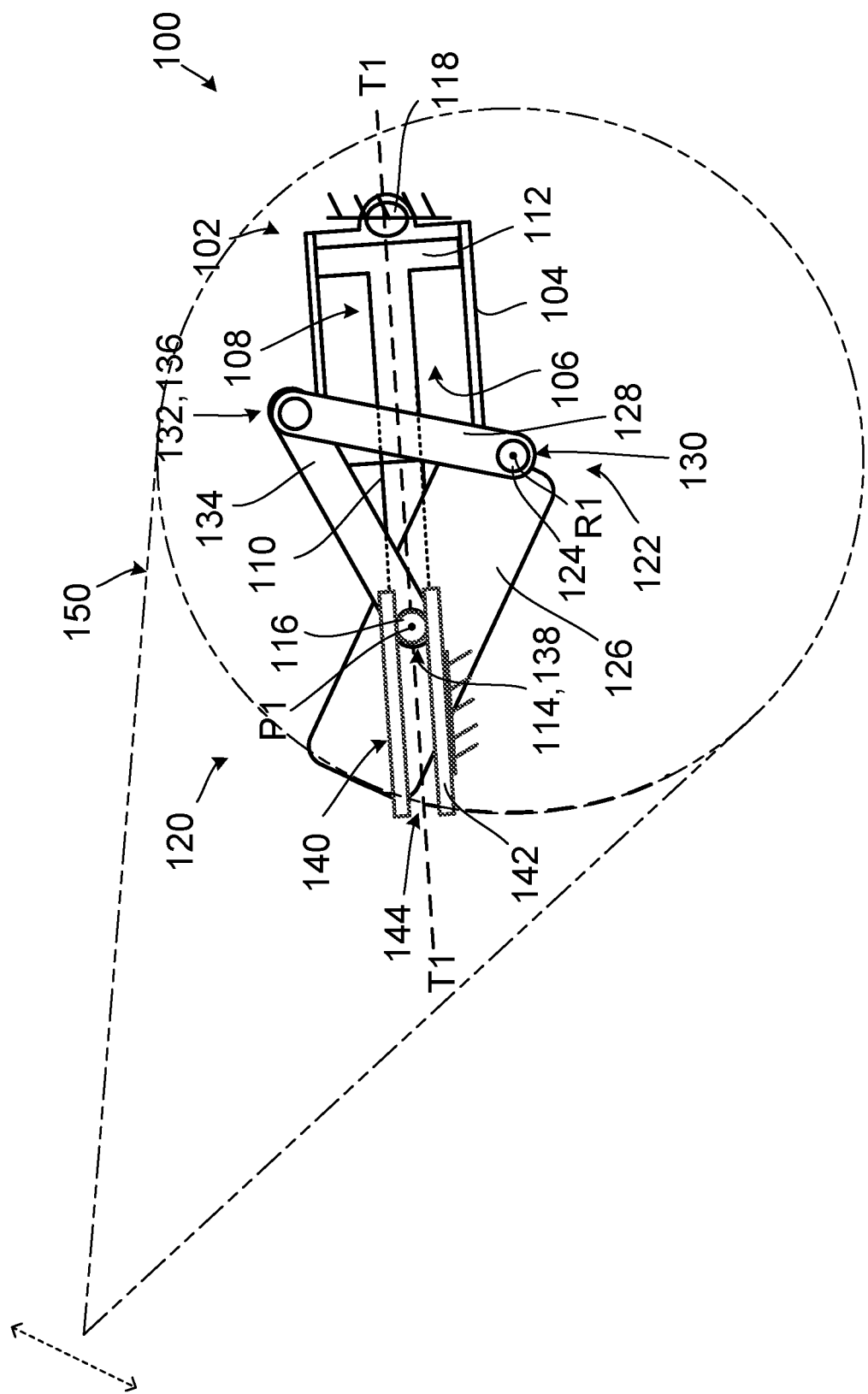
FIGS. 1C and 1D are schematic side views of example apparatuses connected to an example wing element that is rotatable about a rotary joint.
Figure 1D:
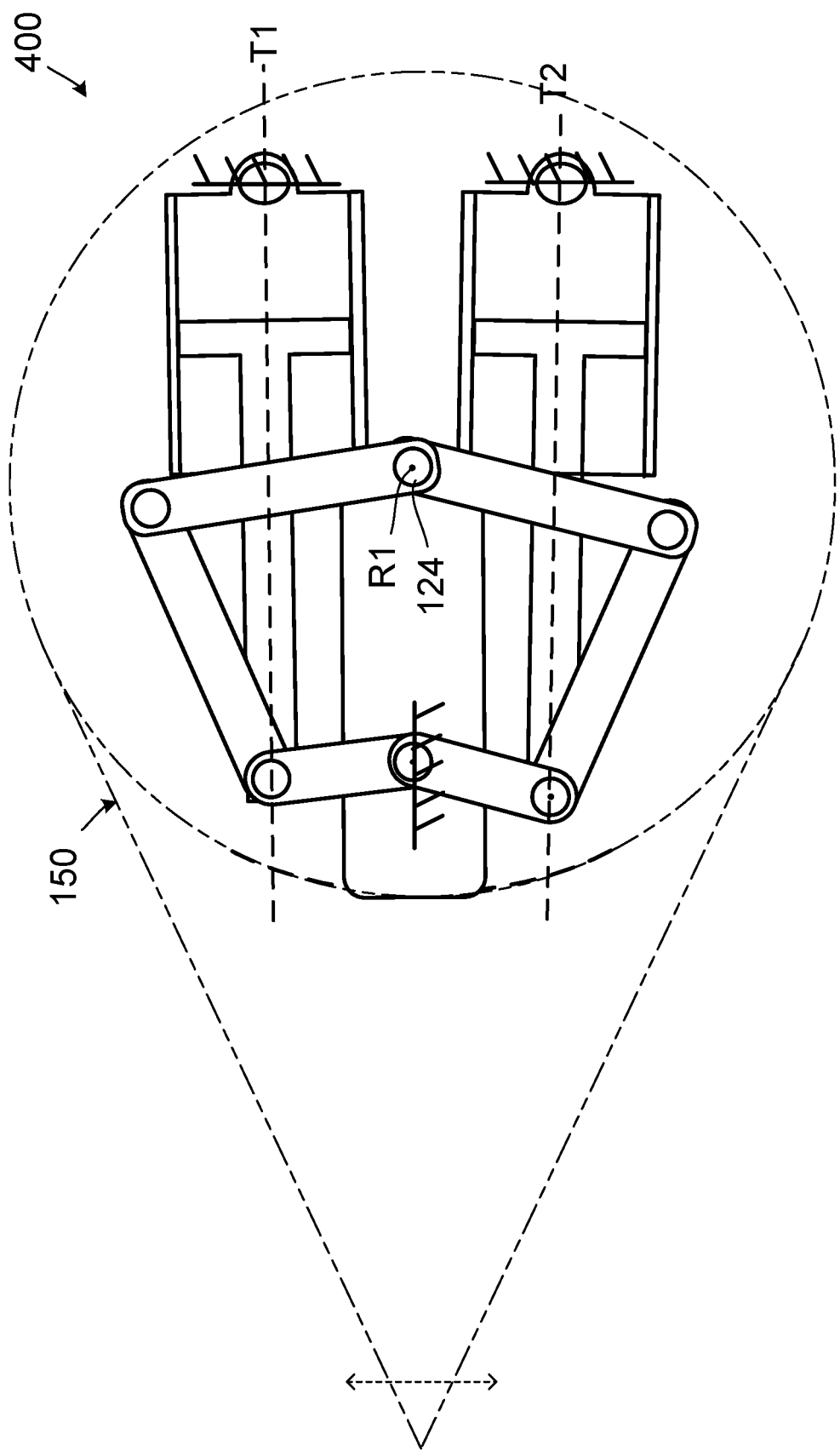

In some implementations, the example apparatus 100 forms part of a linear-to-rotary motion system of an aircraft, where the rotor arm 122 connects to and moves a rotatable spar of an aircraft wing. The example apparatus 100 is compact to fit within a similar design envelope as an RPA while providing a similar or improved range of rotor arm angular output, a similar or lighter overall weight, little to no backlash, reduced or eliminated side loads on seals, a substantially flat torque curve, and/or a centering bias (i.e., toward a neutral center position of the rotor arm 122) over an RPA. For example, a distance from the second rotary joint 118 to the first rotary joint 124 is relatively less than a distance from the second rotary joint 118 to the piston shaft end 114 to shrink the mechanical envelope of the moving parts of the apparatus 100. The entire envelope of the apparatus 100 could be within the circular envelope created by swinging arm 126 one full revolution. In this way, the actuator 102 or other components of the apparatus 100 do not violate the skin of a wing element rotatable about rotary joint 124. For reference, FIG. 1C is a schematic side view of the example apparatus 100 of FIG. 1A connected to an example wing element 150 rotatable about axis R1 at rotary joint 124. The example wing element 150 includes a substantially circular body portion centered on axis R1 and a spar element extending from the body portion, both shown in dashed lines. Further, FIG. 1D shows a schematic side view of an example apparatus 400 of FIG. 4A (described later) connected to the example wing element 150 of FIG. 1C.

The linear actuator 102 of the example apparatus 100 of FIGS. 1A and 1B is a fluid actuator, such as a hydraulic actuator. In particular, the example linear actuator 102 is a double-acting fluid actuator, where a hydraulic system (not shown) connects to the piston chamber 106 at both opposing sides of the piston cylinder 112. In other words, the hydraulic system uses pressurized fluid to act on the piston cylinder 112 in either longitudinal direction along the translation axis T1 to translate the piston cylinder 112, and thereby the piston shaft end 114, along the translation axis T1. The piston cylinder 112 can include a seal, such as one or more elastomeric seals or rings (e.g., O-rings) between an outer surface of the piston cylinder 112 and an inner surface of the piston chamber 106, to fluidly separate the pressurized fluid in the piston chamber 106 on either side of the piston cylinder 112. In some implementations, the actuator housing 104 substantially fluidly encloses the piston chamber 106 to effectively allow pressurized fluid in the piston chamber 106 to impart a force on the piston cylinder 112 to translate the piston 108. While not shown in FIGS. 1A and 1B, the hydraulic system can include fluid pathways that fluidly connect to the piston chamber 106 on the opposing sides of the piston cylinder 112. These fluid pathways allow for pressurized fluid to flow to either side of the piston chamber and impart a desired translative force on the piston cylinder 112. The fluid pathways can include rigid or flexible tubing.

Figure 2A:
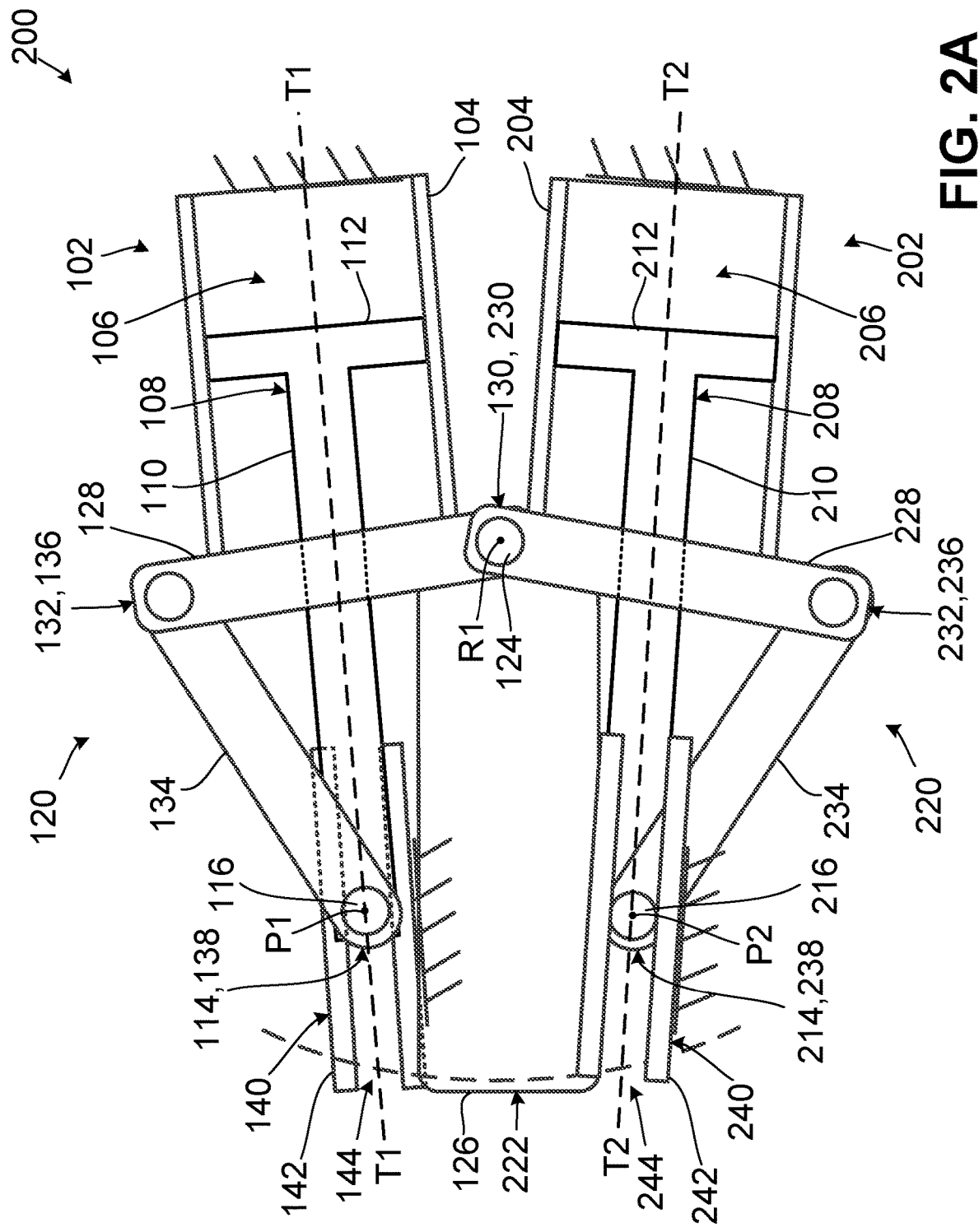
FIGS. 2A 2B, and 2C are schematic side views of another example linear-to-rotary motion apparatus in a neutral center position, a first position, and a second position, respectively.
Figure 2B:
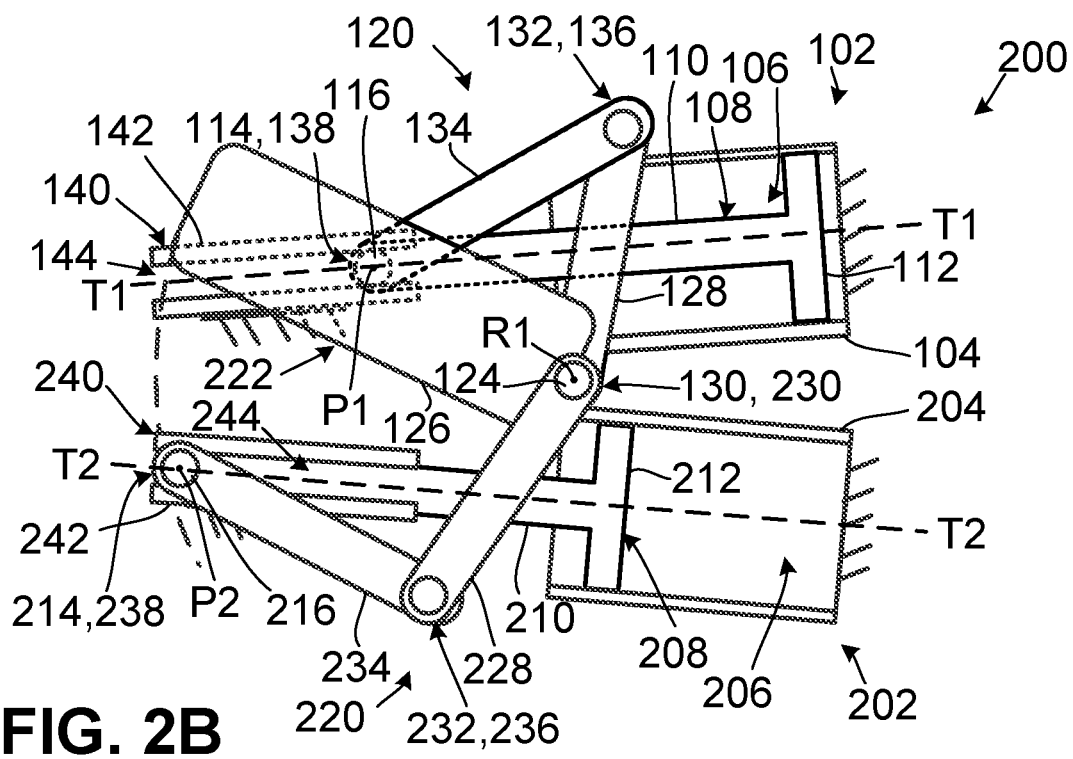
Figure 2C:
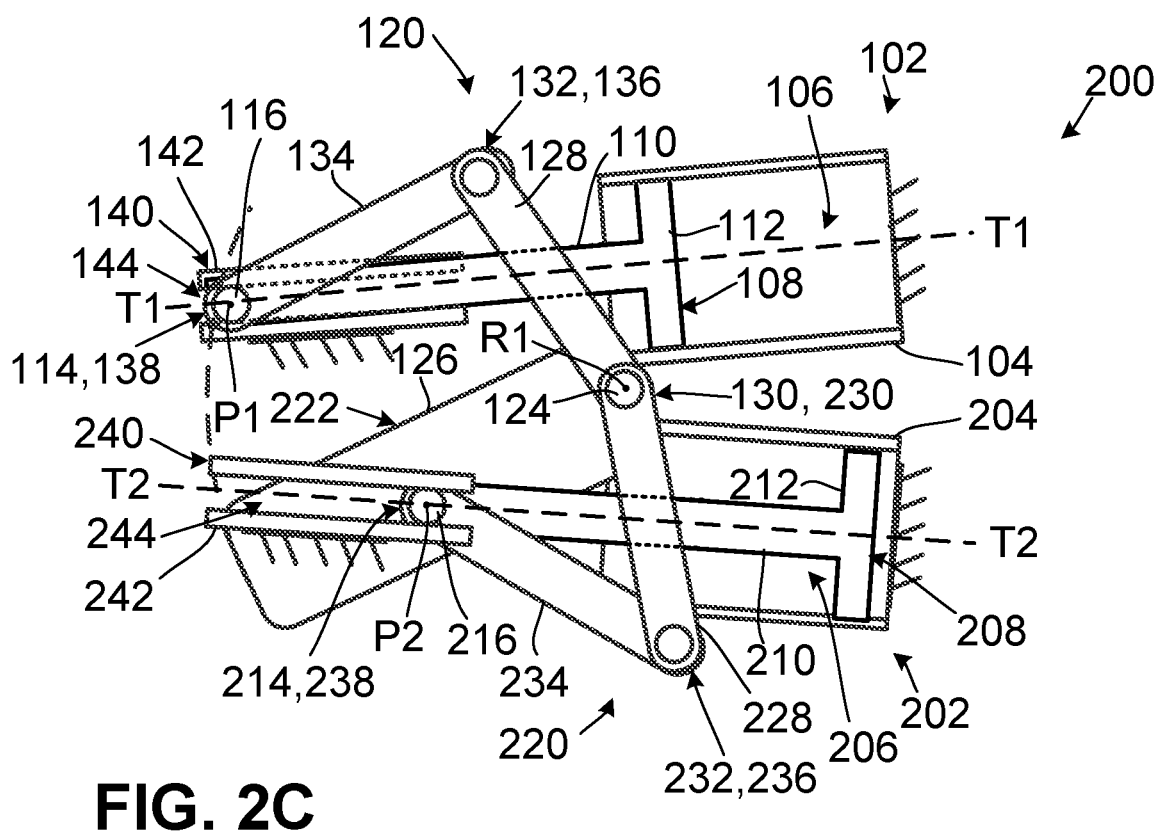

In some implementations, the example linear-to-rotary apparatus 100 can include an additional linear actuator, for example, that acts opposite the first linear actuator 102, to supplement the actuated rotation of the rotor arm 122, and the rotor apparatus 120 can include additional features and linkages to connect to the additional linear actuator. For example, FIGS. 2A, 2B, and 2C are schematic side views of a second example linear-to-rotary motion apparatus 200 similar to example apparatus 100, except example second apparatus 200 includes a second linear actuator 202 that acts opposite to the first linear actuator 102, and the first linear actuator 102 and second linear actuator 202 are fixedly mounted in space, as opposed to rotatably coupled to a rotary joint (e.g., first linear actuator 102 coupled to rotary joint 118 as shown in FIGS. 1A and 1B). Further, the second example apparatus 200 includes a second rotor apparatus 220 similar to the first rotor apparatus 120 of FIGS. 1A and 2A, except the second rotor apparatus 220 includes additional, mirrored or symmetrical features to connect to the second linear actuator 202. FIG. 2A shows the apparatus 200 in a neutral center position, where the first rotor arm portion 126 is positioned at a rotary center position. FIG. 2B shows the apparatus 200 in a first position similar to the first position of FIG. 1A, and FIG. 2C shows the example second apparatus 200 in a second position similar to the second position of FIG. 1B.

The neutral center position of the second example apparatus 200 of FIG. 2A defines a center plane of symmetry through the first rotary joint 124 and the first rotor arm portion 126. However, the center plane of symmetry shows symmetry of the 2D viewing plane of rotation, and not necessarily physical symmetry of parts. The second linear actuator 202 substantially mirrors the first linear actuator 102 across the center plane when the second example apparatus 200 is in the neutral center position of FIG. 2A (e.g., centered between the first position of FIG. 2B and the second position of FIG. 2C). The second linear actuator 202 acts opposite to the first linear actuator 102 in that the second linear actuator 202 is extended when the first liner actuator 102 is retracted, and the second linear actuator 202 is retracted when the first linear actuator 102 is extended.

As described earlier, the second linear actuator 202 of the example second apparatus 200 mirrors the first linear actuator 102, and includes many similar elements as the first linear actuator 102 but positioned substantially symmetrically across the center plane when the apparatus 200 is in the neutral center position. For example, the second linear actuator 202 includes a second actuator housing 204 with a second piston chamber 206, and a second piston 208 with a second piston shaft 210 disposed at least partially within the second piston chamber 206. The second piston 208, including the second piston shaft 210 and a second piston cylinder 212, translates within the second piston chamber 206 along a second translation axis T2. The second translation axis T2 is a longitudinal axis centered on and extending along the longitudinal length of the second piston shaft 210 and second piston cylinder 212. The second piston cylinder 212 is a cylindrical portion of the second piston 208 configured to sealingly engage an inner surface of the second actuator housing 204 and translate within the second piston chamber 206 of the second actuator housing 204. In some implementations, the second linear actuator 202 is a fluid actuator (e.g., hydraulic actuator), such that pressurized fluid within the second piston chamber 206 imparts a directional force on the second piston cylinder 212 along the second translation axis T2 and drives the second piston 208 to translate along the second translation axis T2 in response to the directional force. A second piston shaft end 214, at a longitudinal end of the second piston shaft 210 opposite the second piston cylinder 212, selectively extends and retracts linearly along the second translation axis T2 relative to the second actuator housing 204.

In some implementations, the second actuator housing 204 is pivotably mounted on a rotary joint, and configured to at least partially pivot about the rotary joint. For example, the second actuator housing 204 can be pivotably mounted on a rotary joint such that the second actuator housing 204, the second piston 208, and the second translation axis T2 can rotate, or pivot, about the rotary joint during operation. However, the second actuator housing 204 can be mounted in other ways. For example, the second actuator housing 204 can be fixedly mounted to a fixed surface (e.g., a stationary portion of a wing), as depicted in FIGS. 2A-2C, or otherwise mounted to a surface. In some examples, the type of mounting of the second linear actuator 202, particularly the second actuator housing 204, can be at least partially dependent on the type of structural connections or linkages between the second piston shaft 210 and the rotor apparatus.

The example second apparatus 200 includes a second rotor apparatus 220 that is similar to the rotor apparatus 120 of FIGS. 1A and 1B, except the second rotor apparatus 220 of the example second apparatus 200 includes a rotor arm 222 with a third rotor arm portion 228 in addition to the first rotor arm portion 126 and second rotor arm portion 128. Also, the second rotor apparatus 220 includes a second torque linkage 234 in addition to the first torque linkage 134. The third rotor arm portion 228 is positioned symmetrically opposite the second rotor arm portion 128 across the center plane, and the second torque linkage 234 is positioned symmetrically opposite the first torque linkage 134 across the center plane. The second rotor apparatus 220 connects to both the first linear actuator 102 (via the first torque linkage 134) and the second linear actuator 202 (via the second torque linkage 234). The second rotor apparatus 220 receives a linear input from the first linear actuator 102 (e.g., a linear translation of the piston 108) and a second linear input from the second linear actuator 202 (e.g., a linear translation of the second piston 208), and converts the linear inputs to a rotary output of a rotor element (e.g., the rotor arm 222).

The rotor arm 222 of the second rotor apparatus 220 rotatably couples, or pivotably couples (e.g., couples so as to be able to pivot), to the first rotary joint 124 and is configured to at least partially rotate or pivot about the first rotary joint 124. The rotary joint 124 defines the first rotational axis R1 about which the rotor arm 222 can pivot. In some instances, the first rotational axis R1 is perpendicular (exactly or substantially) to both the first translation axis T1 and the second translation axis T2.

FIGS. 2A-2C schematically show the second rotor arm 222 as including the first rotor arm portion 126, the second rotor arm portion 128, and the third rotor arm portion 228. While FIGS. 2A-2C show the second rotor arm 222 as having three distinct rotor arm portions 126, 128, and 228, the rotor arm portions 126, 128, and 228 are at least partially coupled to each other such that the first rotor arm portion 126, the second rotor arm portion 128, and the third rotor arm portion 228 rotate, or pivot, about the first rotary joint 124 together. For example, a force applied to any of the first rotor arm portion 126, the second rotor arm portion 128, or the third rotor arm portion 228 can cause the entire rotor arm 222 to rotate about the first rotary joint 124.

The third rotor arm portion 228 (or third rotor arm) extends radially from the first rotary joint 124. In some implementations, a third rotor arm end 230 of the third rotor arm portion 228 (e.g., a longitudinal end of the third rotor arm portion 228 proximate to the first rotary joint 124) is affixed to the first rotor arm portion 126, and a fourth rotor arm end 232 of the third rotor arm portion 228 (e.g., a longitudinal end of the third rotor arm portion 228 opposite the first rotary joint 124 and opposite the third rotor arm end 230) can be spaced away from the first rotor arm portion 126.

The second torque linkage 234 pivotably connects to the second rotor arm 222 at a third end of the second torque linkage 234 and pivotably connects to the second piston shaft 210 at a fourth end of the second torque linkage 234. In the example second apparatus 200 of FIGS. 2A-2C, the second torque linkage 234 pivotably connects to the fourth rotor arm end 232 of the third rotor arm portion 228 at a third torque linkage end 236 (e.g., a longitudinal end of the second torque linkage 234), and pivotably connects to the second piston shaft end 214 at a fourth torque linkage end 238 (e.g., a longitudinal end of the second torque linkage 234 opposite the third torque linkage end 236). The pivot connection at the second piston shaft end 214 defines a second pivot connection joint 216, where the second piston shaft 210 pivotably connects to the second torque linkage 234. The second pivot connection joint 216 defines a second pivot axis P2 that is (substantially or exactly) perpendicular to the second translation axis T2, and in some instances, intersects the second translation axis T2 at the second piston shaft end 214.

The second piston 208, second rotor arm 222, and second torque linkage 234 are also rigid structures with pivot connections, as described earlier. The respective translations of the first piston 108 and the second piston 208 are opposite each other, in that the first piston 108 extends as the second piston 208 retracts, and the first piston 108 retracts as the second piston 208 extends. The mirrored, symmetrical example second apparatus 200 and the opposite-acting translation of the pistons 108 and 208 maximizes output torque of the second rotor arm 222, and eliminates or reduces bending loads on the linear actuators 102 and 202. Similar to the schematic views of FIGS. 1A and 1B, some of the elements of the example second apparatus 200 are positioned in offset, parallel planes to avoid interference of parts and to maximize an effective driving radius of the second rotor arm 222. In some examples, first actuator 102 and second actuator 202 are in the same plane (e.g., a plane intersecting T1 and T2, normal to axis R1). Arms 126, 128, and 228 can also be in the same plane, for example, if integrated into a single piece. Links 134 and 234 can be in a single plane, for example, since they do overlap each other. One or both of links 134 and 234 can also be partially within the plane of the piston cylinders 112 and 212, but not in the plane of the piston shaft 110 and 210.

The example second apparatus 200 also includes a second guide structure 240 that connects to and at least partially guides movement of the second pivot connection joint 216 during actuation of the second linear actuator 202 (for example, translation of the second piston 208 relative to the second actuator housing 204). The second guide structure 240 is like the first guide structure 140, and can reduce or eliminate bending moments in the second piston 208, second torque linkage 234, and/or second rotor arm 222 such that the stresses in the apparatus 200 are primarily simple tension, compression, or shear.

In the example apparatus 200 of FIGS. 2A-2C, the second guide structure 240 includes a second guide slider 242 that is positionally fixed in space relative to the first rotary joint 124 and slidably couples to the second pivot connection joint 216. The second guide slider 242 is like the first guide slider 142, except it guides sliding movement of the second pivot connection joint 216 within the second channel 244. In some implementations, the second guide slider 242 is positioned symmetrically across the central plane from the first guide slider 142. The second guide slider 242 guides a sliding movement of the second pivot connection joint 216, for example, by providing the second channel 244 for the second pivot connection joint 216 to travel along. In some examples, the second pivot connection joint 216 includes a peg or other protrusion that engages the second channel 244 of the second pivot connection joint 216. In the example second apparatus 200 of FIGS. 2A-2C, the second channel 244 is linear, and extends parallel to (e.g., in line with) the second translation axis T2. However, the shape and orientation of the second channel 244 can vary. For example, the second channel 244 of the second guide slider 242 can be curved (e.g., an arc shape), angled offset from the second translation axis T2, parallel but offset from the second translation axis T2, or another shape and/or orientation.

FIGS. 2B and 2C show a first, fully retracted position of the first piston 108 and a second, fully extended position of the first piston 108, respectively; whereas, the second piston 208 is in a fully extended position and a fully retracted position, respectively, opposite the first piston 108. One or both of the linear actuators 102 and 202 of the example second apparatus 200 of FIGS. 2A-2C can be a fluid actuator, such as a hydraulic actuator. In particular, the first linear actuator 102 and second linear actuator 202 form a double-acting fluid actuator, where a hydraulic system (not shown) connects to the first piston chamber 106 at both opposing sides of the first piston cylinder 112 and connects to the second piston chamber 206 at both opposing sides of the second piston cylinder 212. In other words, the hydraulic system uses pressurized fluid to act on the first piston cylinder 112 in a first longitudinal direction along the first translation axis T1 to translate the first piston cylinder 112 along the first translation axis T1, and uses the pressurized fluid to also act on the second piston cylinder 212 in a second longitudinal direction generally opposing the first longitudinal direction and along the second translation axis T2 to translate the second piston cylinder 212 along the second translation axis T2. In some implementations, a head end of the first piston chamber 106 is hydraulically connected to a shaft end of the second piston chamber 206, and a shaft end of the first piston chamber 106 is hydraulically connected to a head end of the second piston chamber 206 so that the differential pressure supplied to the first piston chamber 106 and the second piston chamber 206 extends one of the first piston shaft end 114 or the second piston shaft end 214 while simultaneously retracting the other of the first piston shaft end 114 or second piston shaft end 214.

Figure 3A:
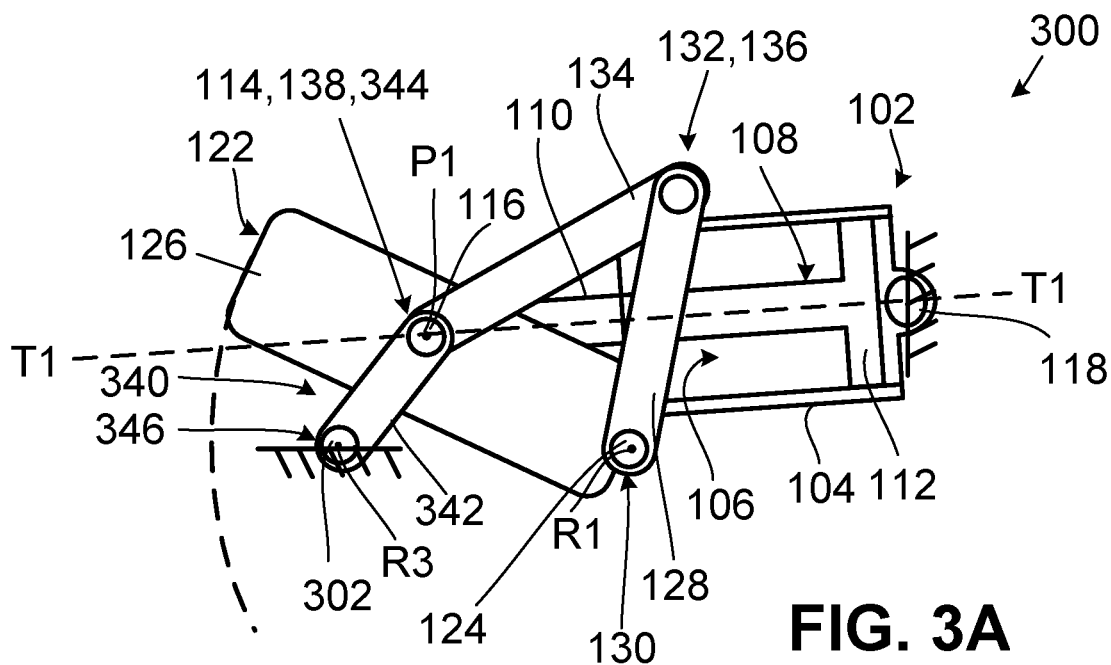
FIGS. 3A and 3B are schematic side views of another example linear-to-rotary motion apparatus in a first position and a second position, respectively.
Figure 3B:
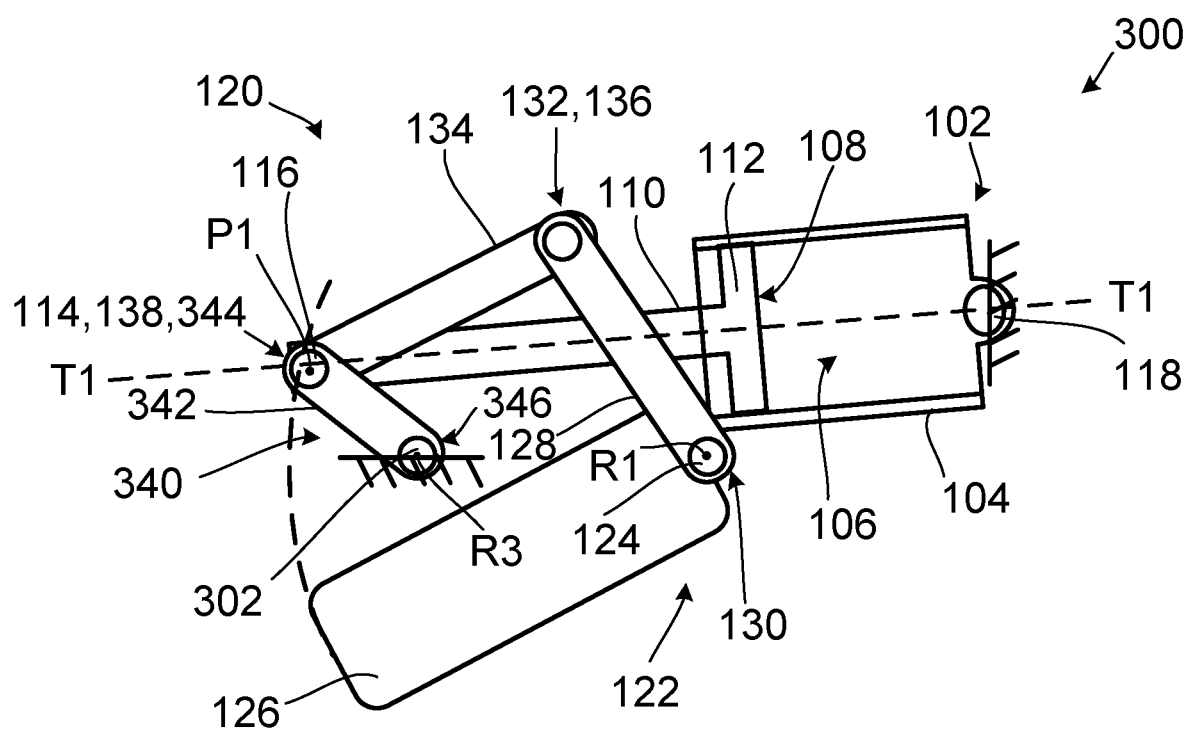

As described earlier, the guide structure (e.g., guide structure 140 of FIGS. 1A-2C, or second guide structure 240 of FIGS. 2A-2C) can take many forms. FIGS. 3A and 3B are schematic side views of another example linear-to-rotary motion apparatus 300, where FIG. 3A shows the apparatus 300 in a first position and FIG. 3B shows the apparatus 300 in a second position. The example third apparatus 300 of FIGS. 3A and 3B is the same as the apparatus 100 of FIGS. 1A and 1B, except that the guide structure is different. For example, example third apparatus 300 has a third guide structure 340 that includes a guide linkage 342 connected at a first guide linkage end 344 to the first pivot connection joint 116 and connected at a second guide linkage end 346 opposite the first guide linkage end 344 to a third rotary joint 302. The third rotary joint 302 is fixed in space relative to the first rotary joint 124, and defines a third rotational axis R3 perpendicular to the translation axis T1 and parallel to the first rotational axis R1. The guide linkage 342 is configured to at least partly pivot about the third rotational axis R3 at the third rotary joint 302. The guide linkage 342 guides movement of the pivot connection joint 116 along an arced, rocker-type path about the third rotary joint 302 as the piston 108 translates along the translation axis T1. The third guide structure 340 can reduce or eliminate bending moments in the piston 108, torque linkage 134, and/or rotor arm 122 such that the stresses in the example third apparatus 300 are primarily simple tension, compression, or shear.

The longitudinal length of the guide linkage 342 can vary. In some implementations, the longitudinal length between the pivot connections of the guide linkage 342 is greater than half of the maximum translation distance of the piston 108.

For example, for an example piston 108 longitudinal length of 2.7 inches that produces a 44 degree total stroke of the rotor arm output 126, the guide linkage 342 (and guide linkage 442) can have a longitudinal length between its respective pivot connections of 0.85 inches, where the sum of travel of the piston 108 can be about 1.14 inches. (E.g., see chart 500 of FIG. 5, described later). The output rotation can be increased by lengthening links 342 and 442, along with the actuator stroke and length. For example, by increasing the length of the piston 108 by about 0.1 inches, the guide linkage 342 (and guide linkage 442) by about 0.1 inches, and the sum of travel of the piston 108 by about 0.2 inches, the example piston 108 can have a longitudinal length of 2.8 inches that produces a 53 degree total stroke of the rotor arm output 126. In this example, the guide linkage 342 (and guide linkage 442) can have a longitudinal length between its respective pivot connections of 0.95 inches and the sum of travel of the piston 108 is about 1.34 inches. The lengths of these linkages can vary, and be optimized to produce a desired output torque, desired output stroke, another output parameter, or a combination of these desired outputs. At certain limits of length, the actuator can produce no torque or binds the linkages.

Figure 4A:
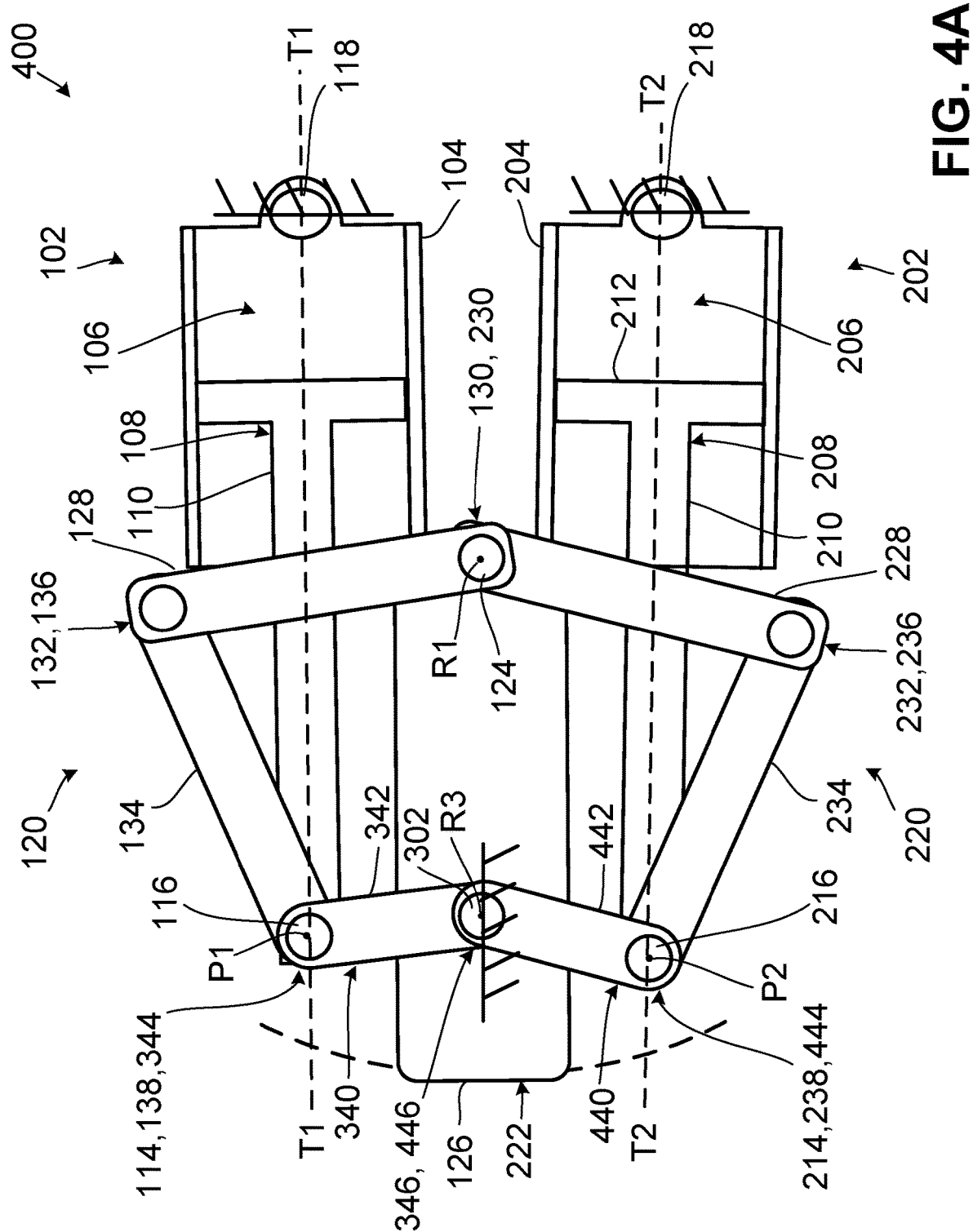
FIGS. 4A, 4B, and 4C are schematic side views of another example linear-to-rotary motion apparatus in a neutral center position, a first position, and a second position, respectively.
Figure 4B:
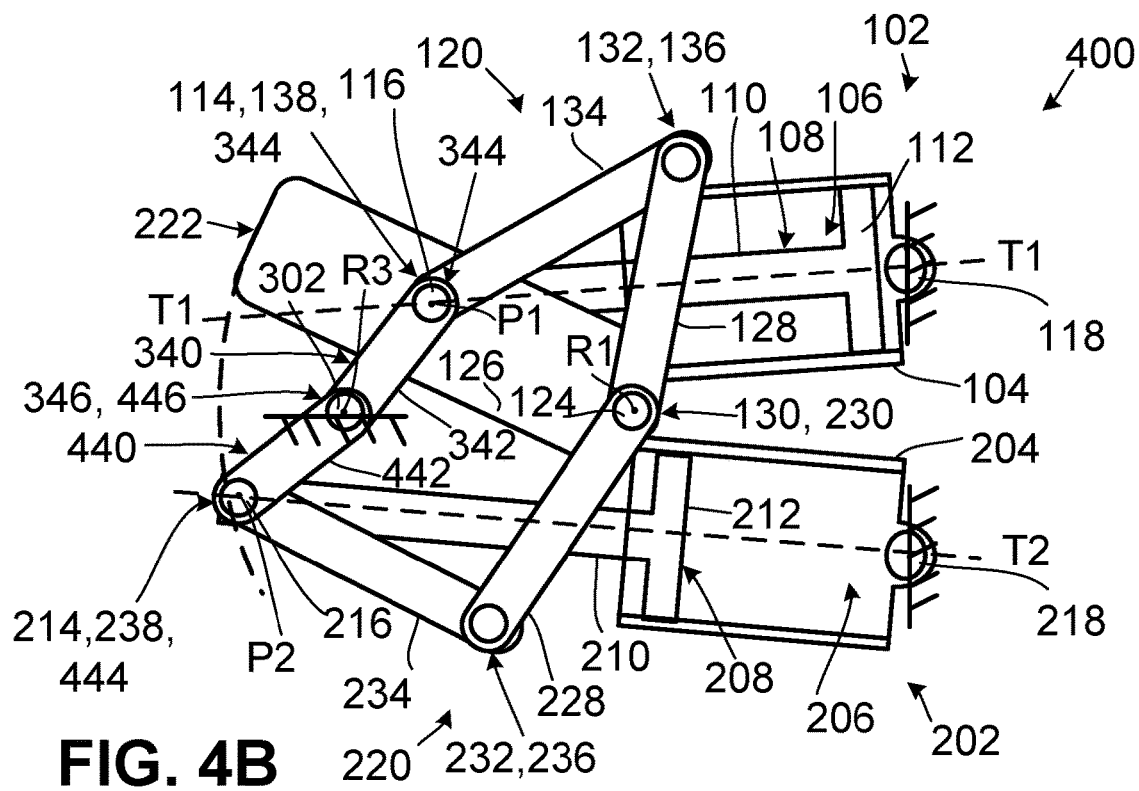
Figure 4C:
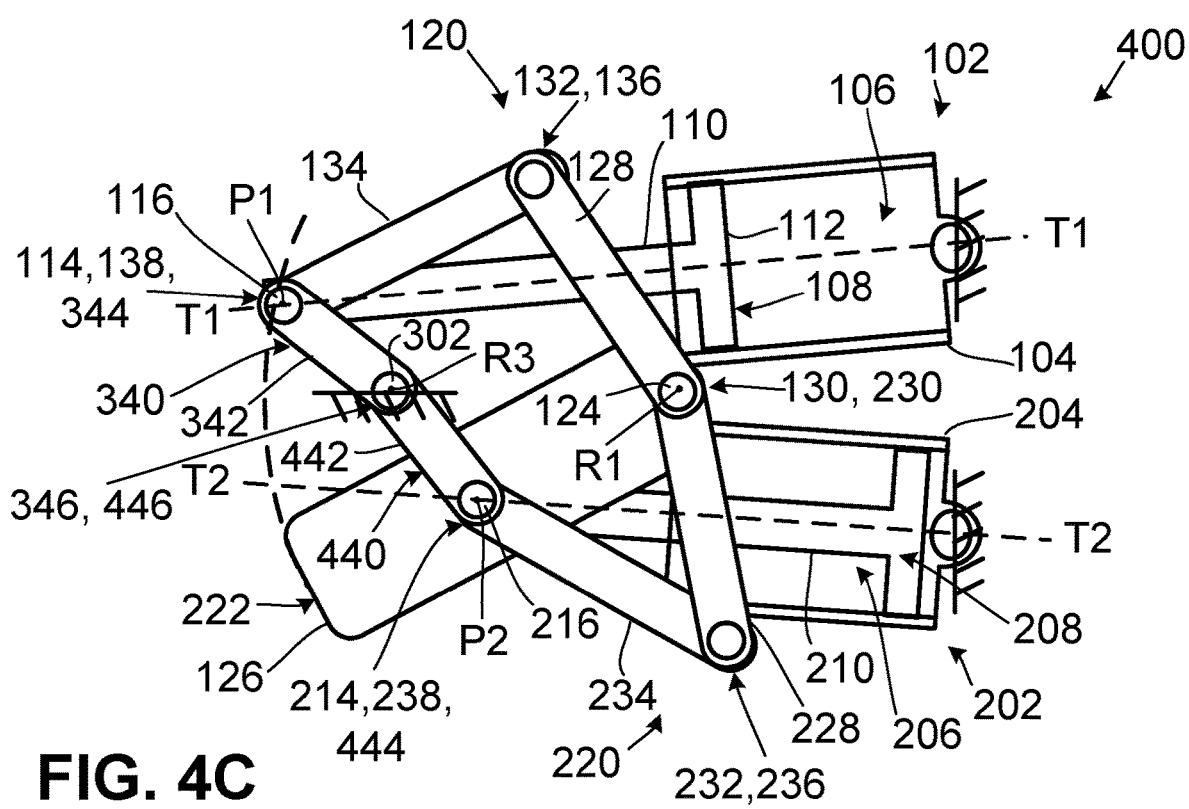

As described earlier, some implementations of the linear-to-rotary apparatus 300 can include one or more additional linear actuators, for example, that act with or opposite the first linear actuator 102 to supplement the actuated rotation of the rotor arm 122, and the rotor apparatus 120 can include additional features and linkages to connect to the one or more additional linear actuators. For example, FIGS. 4A, 4B, and 4C are schematic side views of a fourth example linear-to-rotary motion apparatus 400 similar to example second apparatus 200 and example third apparatus 300. In particular, example fourth apparatus 400 is like example second apparatus 200 of FIGS. 2A-2C, except that the example fourth apparatus 400 includes two guide structures similar to the third guide structure 340 of FIGS. 3A and 3B, and the first actuator housing 104 and second actuator housing 204 are rotatably mounted to the second rotary joint 118 and a fourth rotary joint 218, respectively. FIG. 4A shows the apparatus 400 in a neutral center position similar to the neutral center position of FIG. 2A, where the first rotor arm portion 126 is positioned at a rotary center position. FIG. 4B shows the apparatus 400 in the first position similar to the first position of FIG. 2B, and FIG. 4C shows the example fourth apparatus 400 in a second position similar to the second position of FIG. 2C.

The example fourth apparatus 400 is formed in part by the example apparatus 300 of FIGS. 3A and 3B, including the third guide structure 340 with the guide linkage 342 rotatably coupled to the third rotary joint 302. The example fourth apparatus 400 also includes a fourth guide structure 440 similar to the third guide structure 340, except mirrored across the center plane. The fourth guide structure 440 includes a second guide linkage 442 connected at a third guide linkage end 444 to the second pivot connection joint 216 and connected at a fourth guide linkage end 446 opposite the third guide linkage end 444 to the third rotary joint 302. In some implementations, the fourth guide linkage end 446 connects to a fifth rotary joint (not shown) that is fixed in space relative to the first rotary joint 124 but positioned at a location different from the third rotary joint 302.

The second guide linkage 442 is configured to at least partly pivot about the third rotational axis R3 at the third rotary joint 302 (or about a parallel rotational axis at the fifth rotary joint). The second guide linkage 442 guides movement of the second pivot connection joint 216 along an arced, rocker-type path about the third rotary joint 302 as the second piston 208 translates along the second translation axis T2. The fourth guide structure 440 can reduce or eliminate bending moments in the second piston 208, second torque linkage 234, and/or second rotor arm 222 such that the stresses in the example fourth apparatus 400 are primarily simple tension, compression, or shear.

Figure 5:
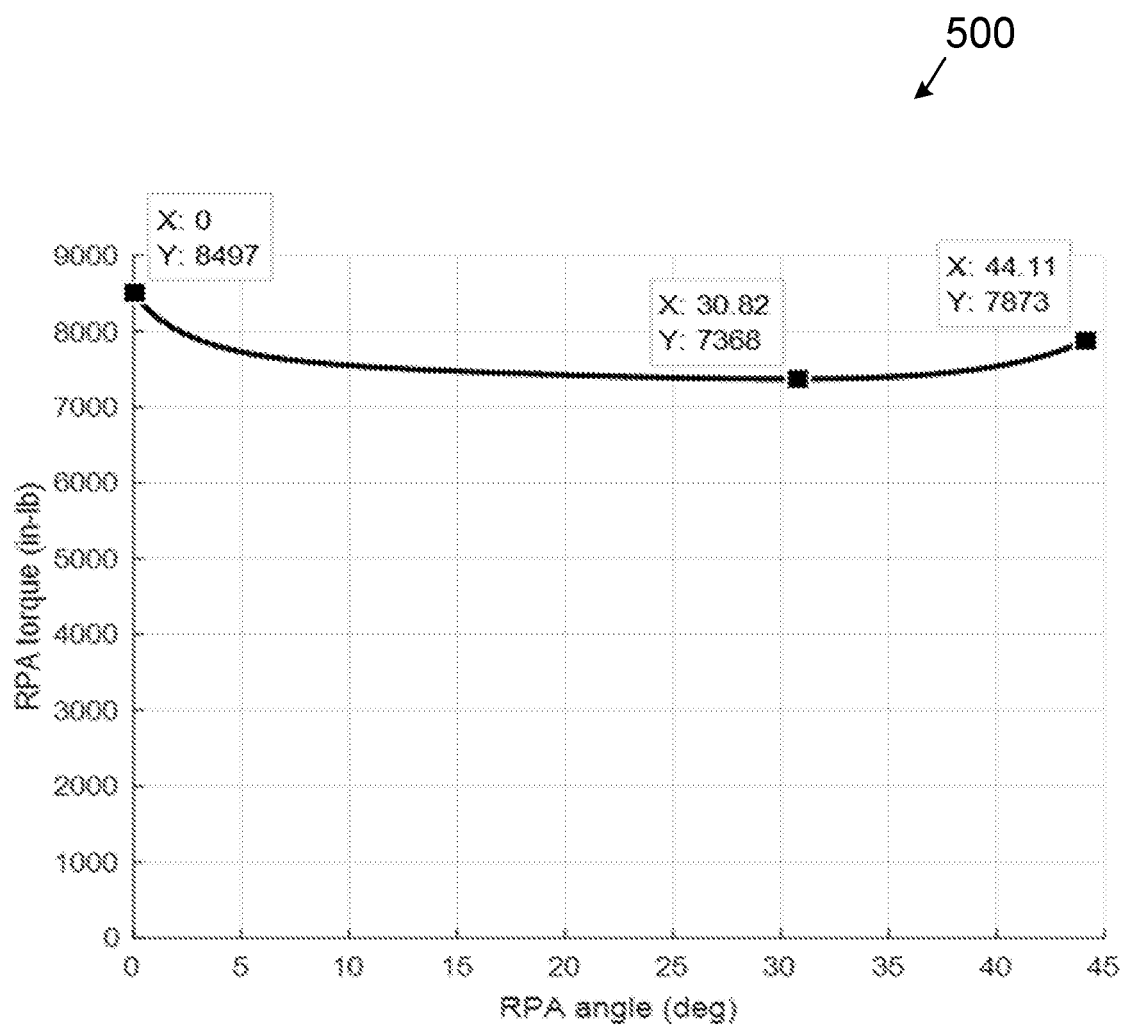
FIG. 5 is a chart showing a torque curve of an example linear-to-rotary motion apparatus.

FIG. 5 is a chart 500 showing a torque curve of an example linear-to-rotary motion apparatus, such as the example linear-to-rotary motion apparatuses 100, 200, 300, or 400 of FIGS. 1A to 4C. The torque curve shows the torque of the rotor arm output over the angular position of the rotor arm. By utilizing the mechanics of links 134 and 234, a largely flat torque curve with increased torque at the extremes (e.g., the maximum and minimum angle output of the rotor arm) can be generated. This is in contrast to some traditional mechanisms, such as slider, scotch yoke, or other examples, that produce maximum torque at mid-stroke and less torque at the extremes. Chart 500 also shows a total stroke output of the rotor arm of about 44 degrees. However, this total stroke output range can vary to an optimized value or range, for example, by adjusting linkage lengths, as described earlier.

Figure 6:
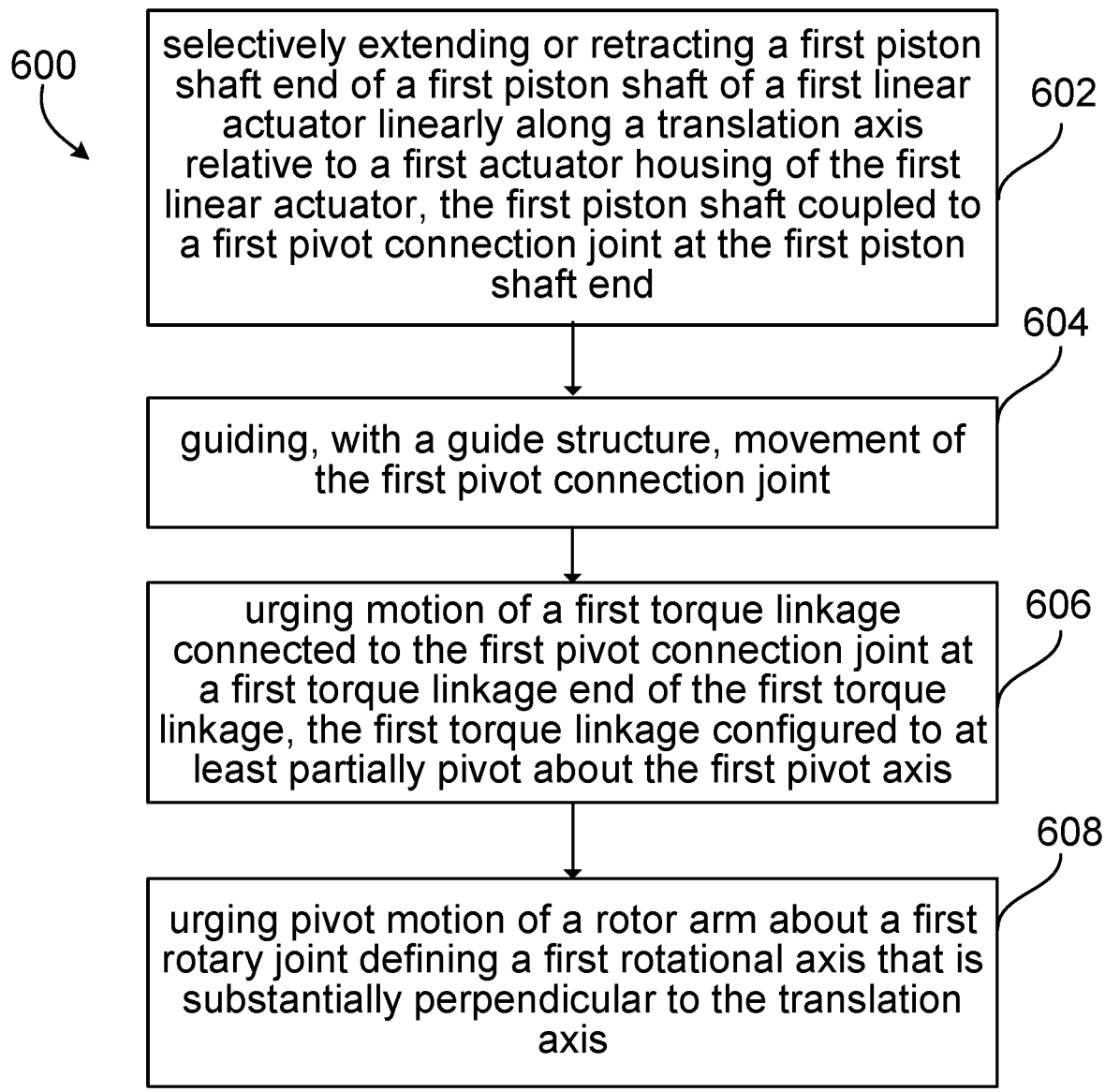
FIG. 6 is flowchart of an example method for transmitting rotary motion.

FIG. 6 is a flowchart describing an example method 600 for transmitting rotary motion, for example, performed by one or more of the example linear-to-rotary motion apparatuses 100, 200, 300, or 400 of FIGS. 1A to 4C. At 602, a first piston shaft end of a first piston shaft of a first linear actuator is selectively extended or retracted linearly along a translation axis relative to a first actuator housing of the first linear actuator. The first piston shaft is at least partially disposed within the first actuator housing, and the first piston shaft is coupled to a first pivot connection joint at the first piston shaft end, where the first pivot connection joint defines a first pivot axis that is substantially perpendicular to the translation axis. At 604, a guide structure guides movement of the first pivot connection joint. At 606, in response to selectively extending or retracting the first piston shaft end of the first piston shaft, a first torque linkage connected to the first pivot connection joint at a first torque linkage end of the first torque linkage is urged to motion. The first torque linkage is configured to at least partially pivot about the first pivot axis, and the first torque linkage includes a second torque linkage end opposite the first torque linkage end. At 608, in response to urging motion of the first torque linkage, a rotor arm is urged to pivot motion about a first rotary joint defining a first rotational axis that is substantially perpendicular to the translation axis. The rotor arm includes a first rotor arm end proximate to the first rotary joint and a second rotor arm end pivotably connected to the second torque linkage end of the first torque linkage. In some implementations, a second rotor arm is coupled to or is integral with the first-mentioned rotor arm, and in response to urging pivot motion of the rotor arm, the second rotor arm is urged to pivot motion about the first rotary joint.

A number of implementations have been described. Nevertheless, it will be understood that various modifications may be made without departing from the spirit and scope of the disclosure.

What is claimed is:
1. A linear-to-rotary motion apparatus comprising:
   a first linear actuator comprising:
      a first actuator housing comprising a first piston chamber; and
      a first piston shaft disposed at least partially within the first piston chamber and configured to translate within the first piston chamber along a first translation axis, the first piston shaft comprising a first piston shaft end configured to selectively extend and retract linearly along the first translation axis relative to the first actuator housing;

a second linear actuator comprising:

a second actuator housing comprising a second piston chamber;

a second piston shaft disposed at least partially within the second piston chamber and configured to translate within the second piston chamber of the second actuator housing along a second translation axis, the second piston shaft comprising a second piston shaft end configured to selectively extend and retract linearly along the second translation axis relative to the second actuator housing; and a rotor apparatus comprising:

a first rotary joint defining a first rotational axis that is substantially perpendicular to the first translation axis;

a rotor arm extending radially from the first rotary joint and configured to pivot about the first rotary joint, the rotor arm having a first rotor arm end positioned away from the first rotary joint, and the rotor arm having a second rotor arm end positioned away from the first rotary joint and away from the first rotor arm end, wherein the second rotor arm end is positioned substantially opposite the first rotor arm end with respect to the first rotary joint;

a first torque linkage having a first torque linkage end pivotably connected to the first rotor arm end of the rotor arm, and a second torque linkage end opposite the first torque linkage end and pivotably connected to the first piston shaft end of the first piston shaft at a first pivot connection joint, the first pivot connection joint defining a first pivot axis that is substantially perpendicular to the first translation axis of the first piston shaft, wherein the rotor arm at least partially overlaps the first piston shaft in a two dimensional viewing plane, the first pivot axis and the first rotational axis being normal to the two dimensional viewing plane;

a second torque linkage having a third torque linkage end pivotably connected to the second rotor arm end of the rotor arm, and a fourth torque linkage end opposite the third torque linkage end and pivotably connected to the second piston shaft end of the second piston shaft at a second pivot connection joint, the second pivot connection joint defining a second pivot axis that is substantially perpendicular to the second translation axis of the second piston shaft and parallel to the first pivot axis of the first pivot connection joint;

a first guide structure connected to the first pivot connection joint and configured to at least partially guide movement of the first pivot connection joint; and a second guide structure connected to the second pivot connection joint and configured to at least partially guide movement of the second pivot connection joint.

2. The apparatus of claim 1, wherein the first guide structure comprises a first guide slider positionally fixed in space relative to the first rotary joint and slidably coupled to the first pivot connection joint, the first guide slider configured to guide sliding movement of the first pivot connection joint parallel to the first translation axis.

3. The apparatus of claim 1, wherein the first linear actuator is a fluid actuator.

4. The apparatus of claim 3, wherein the fluid actuator is a double-acting fluid actuator.

5. The apparatus of claim 1, wherein one of the first actuator housing or the rotor arm is configured to be coupled to an airframe structure of an aircraft, and the other of the first actuator housing or the rotor arm is configured to be coupled to a moveable control surface of the aircraft, such that the moveable control surface is configured to move relative to the airframe structure by the linear-to-rotary motion apparatus.

6. The apparatus of claim 2, wherein the second guide structure comprises a second guide slider positionally fixed in space relative to the first rotary joint and slidably coupled to the second pivot connection joint, the second guide slider configured to guide sliding movement of the second pivot connection joint parallel to the second translation axis.

7. The apparatus of claim 1, wherein:

the first actuator housing and the second actuator housing are configured to be coupled to an airframe structure of an aircraft, and the rotor arm is configured to be coupled to a moveable control surface of the aircraft, such that the moveable control surface is configured to move relative to the airframe structure by the linear-to-rotary motion apparatus; or the first actuator housing and the second actuator housing are configured to be coupled to the moveable control surface of the aircraft, and the rotor arm is configured to be coupled to the airframe structure of an aircraft, such that the moveable control surface is configured to move relative to the airframe structure by the linear-to-rotary motion apparatus.

8. The apparatus of claim 1, wherein at least one of the first linear actuator or the second linear actuator is a fluid actuator.

9. The apparatus of claim 1, wherein at least one of the first linear actuator or the second linear actuator is a double-acting fluid actuator.

* * * * *